United States Patent
Manz et al.

[19]

[11] Patent Number: 5,904,855
[45] Date of Patent: May 18, 1999

[54] CLOSED CHEMICALLY ENHANCED TREATMENT SYSTEM

[75] Inventors: David Harold Manz; Vern John Gattinger, both of Calgary, Canada

[73] Assignee: David H. Manz, Calgary, Canada

[21] Appl. No.: 08/807,623

[22] Filed: Feb. 27, 1997

[51] Int. Cl.⁶ .................................................. C02F 1/52
[52] U.S. Cl. .......................... 210/709; 210/710; 210/721; 210/738; 210/745; 210/748; 210/96.1; 210/112; 210/143; 210/199; 210/205; 210/253; 210/257.1; 210/523
[58] Field of Search .................................. 210/709, 710, 210/727, 738, 745, 748, 721, 760, 96.1, 109, 112, 143, 173, 202, 205, 206, 257.1, 523, 199, 253

[56] References Cited

U.S. PATENT DOCUMENTS

| | | | |
|---|---|---|---|
| 3,045,984 | 7/1962 | Cochran | 259/4 |
| 3,276,994 | 10/1966 | Andrews | 210/760 |
| 3,886,073 | 5/1975 | Briltz | 210/136 |
| 3,965,975 | 6/1976 | Edmundson | 165/108 |
| 4,142,970 | 3/1979 | von Hagel et al. | 210/522 |
| 4,160,724 | 7/1979 | Laughton | 210/760 |
| 4,164,470 | 8/1979 | Briltz | 210/523 |
| 4,178,243 | 12/1979 | Messer | 210/96.1 |
| 4,192,746 | 3/1980 | Arvanitakis | 210/193 |
| 4,260,488 | 4/1981 | Condolios | 210/259 |
| 4,278,541 | 7/1981 | Eis et al. | 210/112 |
| 4,710,290 | 12/1987 | Briltz | 210/199 |
| 4,724,084 | 2/1988 | Pahmeier et al. | 210/709 |
| 4,834,878 | 5/1989 | Anderson | 210/202 |
| 4,840,736 | 6/1989 | Sander et al. | 210/727 |
| 5,006,231 | 4/1991 | Oblad et al. | 210/96.1 |
| 5,037,559 | 8/1991 | Schmitt | 210/709 |
| 5,124,035 | 6/1992 | Dunne et al. | 210/206 |

Primary Examiner—Peter A. Hruskoci
Attorney, Agent, or Firm—Chernoff, Vilhauer, McClung & Stenzel

[57] ABSTRACT

The invention relates to a solids and liquids effluent chemically enhanced treatment system comprising: (a) a pump for grinding solids and pumping ground solids and liquid effluent; (b) an inlet for introducing flocculant and coagulants into the solids and liquid effluent and mixing the flocculant with the solids and liquid effluent; (c) a mixing chamber having an inlet connected to an outlet of the pump, the mixing chamber having sufficient length to enable the flocculant and coagulants to fully mix with the solids and liquids effluent and form flocs which settle from the liquid effluent; (d) a settling chamber connected to an outlet of the mixing chamber, the settling chamber promoting laminar flow to the solids and liquid effluent and having sufficient length to enable the flocs in the liquid effluent to settle from the effluent; (e) a mechanical propulsion device for moving the solids and liquid effluent through the length of the settling chamber; and (f) a clarifier chamber connected to an outlet of the settling chamber, the clarifier chamber separating flocs from the liquid effluent.

25 Claims, 31 Drawing Sheets

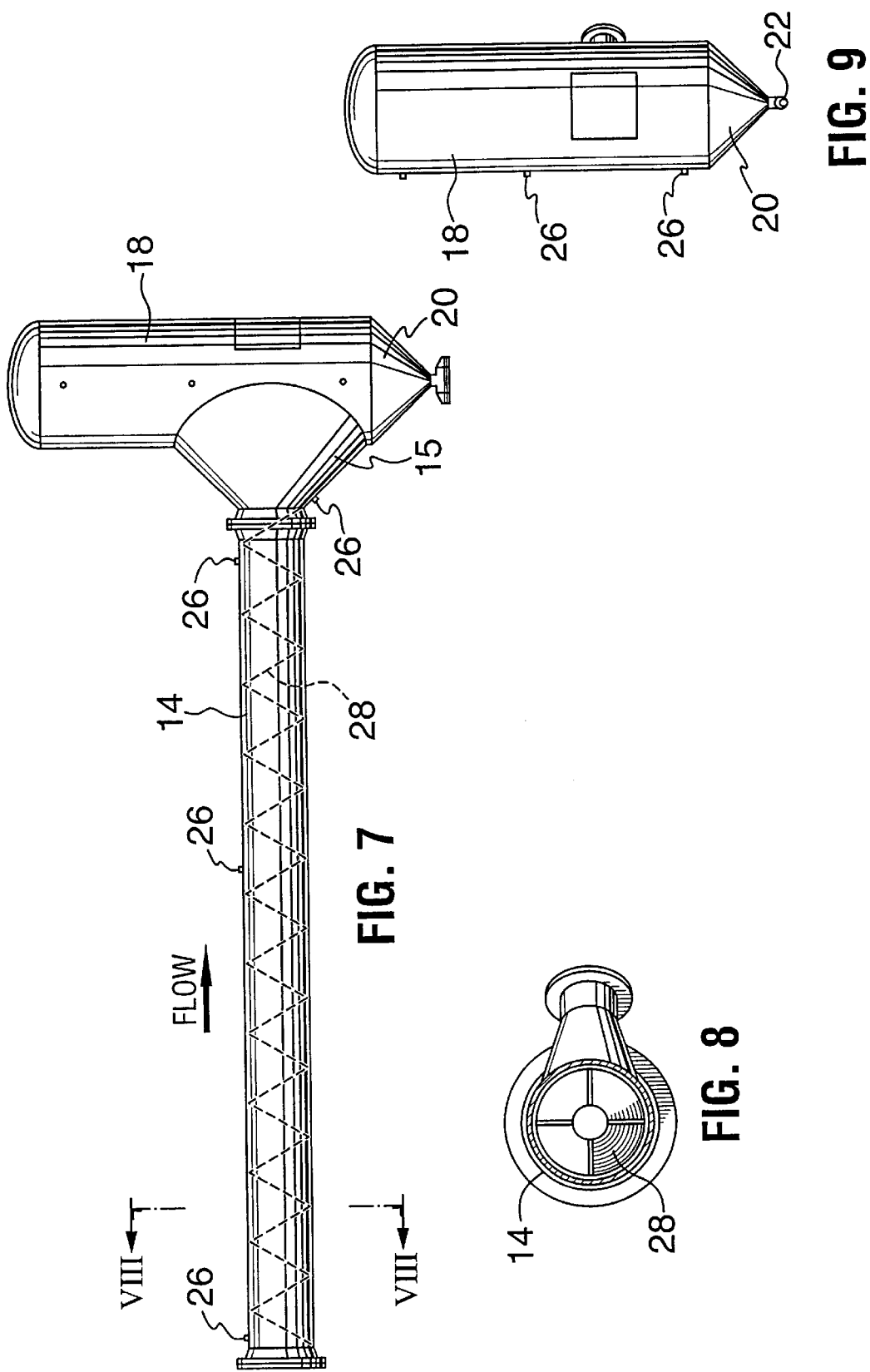

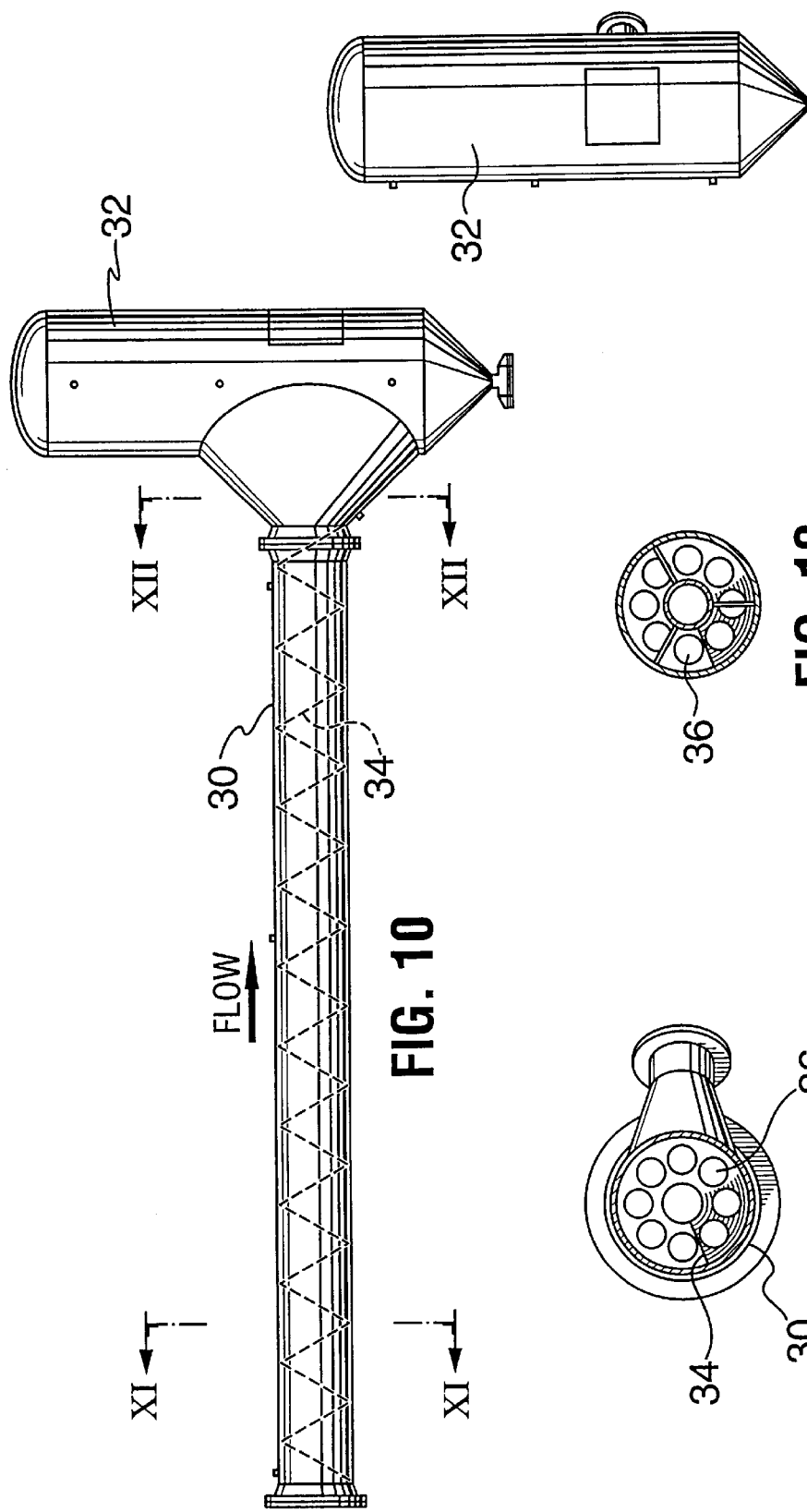

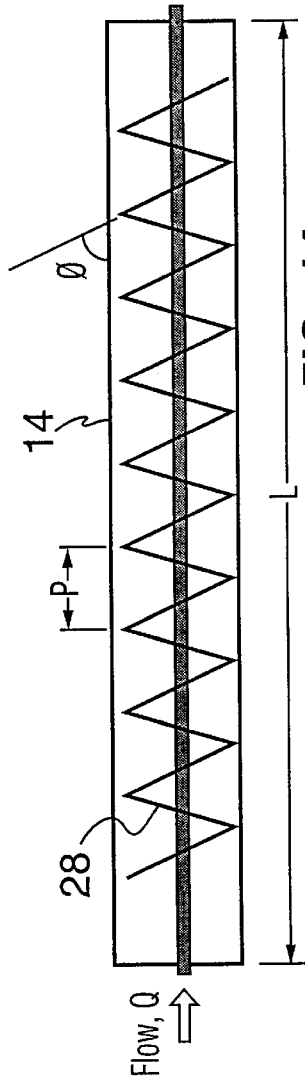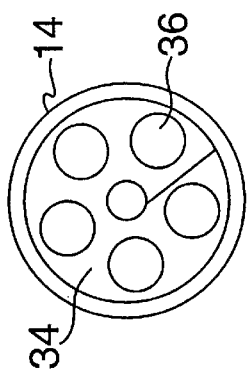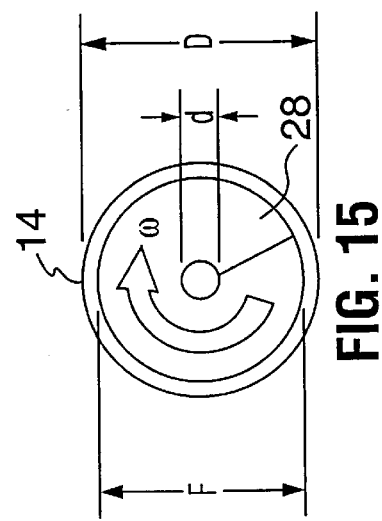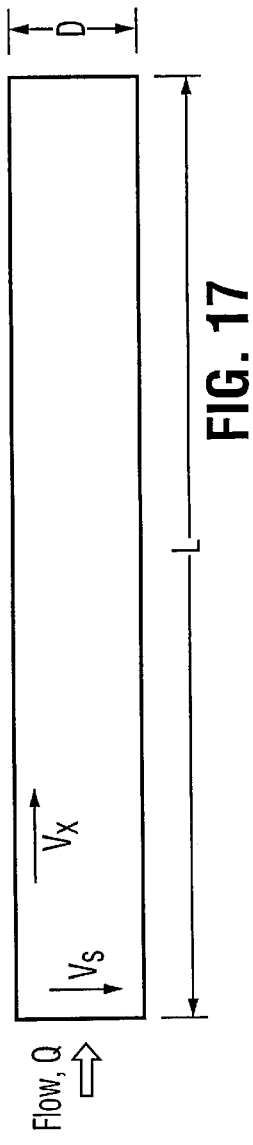

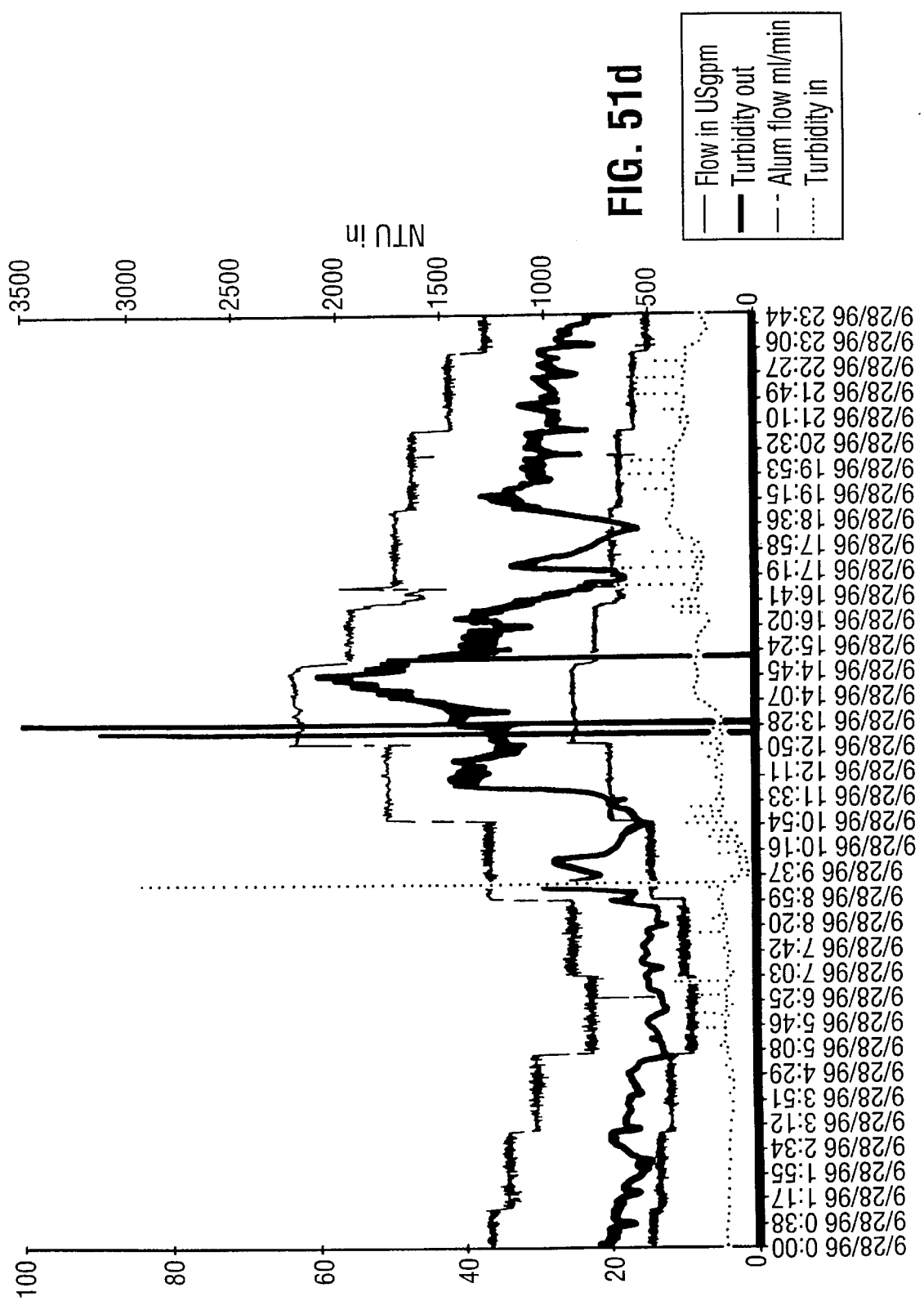

CLOSED CHEMICALLY ENHANCED TREATMENT SYSTEM

FIELD OF THE INVENTION

This invention relates to a novel apparatus and method for the closed chemically enhanced treatment of effluent, such as sewage or industrial effluent, to yield environmentally safe water and solids for disposal. More particularly, this invention relates to a self-contained chemical enhancement effluent unit and method for treating sewage or industrial plant effluent wherein flocculant is added to solid contaminants in the effluent, and the solids are separated from the supernatant through a novel series of elements to yield a clear, liquid disposable effluent, and a disposable or re-usable solid component.

BACKGROUND OF THE INVENTION

Water pollution by mankind is one of the most pressing social and economic problems of our time. Because man irresponsibly discharges great quantities of liquid and solid pollutants into the environment, including river and water bodies, and has thereby disturbed the equilibrium of the ecosystem of the planet, many rivers, lakes and seas no longer have the ability to purify themselves. A main source of water pollution is deleterious sludge or solids contained in sewage and industrial waste.

Throughout the world, industry and governments are increasingly confronted with the challenge and expense of providing modern waste water facilities that meet public demand and enacting stringent regulatory requirements necessary to produce a cleaner environment. In Canada, less than half of all municipal communities have adequate waste water facilities Globally, the need for economic, environmentally friendly sewage and industrial waste water treatment is rapidly approaching a crisis point.

There is a pressing need for a modern, efficient and economical method and apparatus for treating sludge or solids from municipal and industrial wastes to yield clear, liquid effluent (supernatant) which can be readily disposed of, reused or recycled, and solid components which can be broken down into compost and or other environmentally acceptable solids.

A number of purported solutions have been developed over the years for treating effluents of various types. A number of patents which are pertinent to this field of technology have been issued by the U.S. Patent and Trademark Office.

| U.S. Pat. No. | Inventor | Issue Date |
|---|---|---|
| 3,045,984 | Cochran | July, 1962 |
| 3,886,073 | Briltz | May, 1975 |
| 3,965,975 | Edmundson | June, 1976 |
| 4,142,970 | von Hagel et al. | March, 1979 |
| 4,164,470 | Briltz | August, 1979 |
| 4,192,746 | Arvanitakis | March, 1980 |
| 4,260,488 | Condolios | April, 1981 |
| 4,710,290 | Briltz | December, 1987 |
| 4,834,878 | Anderson | May, 1989 |
| 4,830,736 | Sander et al. | June, 1989 |

More recently, U.S. Pat. No. 5,124,035, granted Jun. 23, 1992, Dunne et al., has issued for an invention entitled "Apparatus for Treatment of Effluent". That U.S. patent discloses and claims a system for treating effluents such as sewage. The system includes a mixing chamber and a separation chamber. In the mixing chamber, various chemical additives are introduced into the effluent and mixed to create a flocculent. The flocculated solid materials are separated in the separating chamber. The mixing chamber, which is in the form of a long tube, contains a plurality of perforated transverse baffles which are spaced longitudinally in a helical pattern relative to the longitudinal axis of the tube. Each baffle has tapered holes therein to act as a venturi to mix the materials. In the separating chamber, the mixed materials are caused to flow longitudinally in a purported laminar flow condition to allow stratification between the liquid and the solid materials. The separation chamber contains an auger flight rotates slowly. The flight has holes therein which thus purportedly generate a laminar flow. This is said to provide improved separation of the solid and the liquid components.

A prototype of the Dunne et al. system disclosed and claimed in U.S. Pat. No. 5,124,035, has been tested experimentally and has been found to have some serious shortcomings. One is that the grit in the sewage effluent collects on the baffles in the mixing tube over time. Typical sewage contains a large variety of solids including faeces, condoms, tampons, sanitary napkins, disposable diapers, coffee grounds, tea bags, coffee filters, rags, ground bones, dirt from laundry facilities, sweepings, vacuum cleaner solids, detergent, fibres from various textile sources, hair, fruit and vegetable peelings, garburator refuse, and numerous other types of household and industrial solids. The coffee grounds, dirt, peelings, fibres, and other solid materials that do not lend themselves readily to flocculation and are collectively termed "grit", quickly collect on the baffles and plug the holes in the baffles. This interferes with the operation of the mixing chamber. Before long, the mixing tube has to be opened and the baffles removed for cleaning. Another problem is that adding the chemicals at one or more locations along the length of the tube does not yield optimum mixing of the chemicals with the solids.

SUMMARY OF THE INVENTION

The inventors have invented a modular self-contained closed chemically enhanced effluent treating system (CCETS). The first stage of the system functions by intaking and grinding raw sewage and then pumping the ground sewage into a special mixing chamber. In the mixing chamber, which does not have any baffles, the ground sewage is treated with chemicals. The chemicals are introduced in a manner which will ensure rapid and complete mixing with the sewage prior to entering the special slow mix chamber. One option is to introduce the chemicals at the pump. Another preferred approach is to introduce the chemicals in a rapid mix (dynamic or static) located immediately upstream of the special mixing chamber. The effluent and chemicals are subjected to varying fluid velocities that are program controlled to optimize flocculation and settling of the solids from the supernatant liquid.

In the second stage of the CCETS process, the flocculated suspended solids, which are now termed sludge, pass along the settling chamber and settle to the bottom of the chamber. At the end of the settling chamber, they are removed from the system. Clear supernatant water is drawn off the top. The supernatant is sufficiently clear and innocuous that it can be released to surface water directly without contamination, subject to local regulatory standards.

Optionally, and depending upon the desired water quality and end use requirements, a third stage can be incorporated to treat the effluent. By use of an advanced microbiological filtration and disinfectant process, the water can be treated to remove remaining fine particles, reduce chemical oxygen demand and reduce the microbiological elements to acceptable levels.

Sludge that is removed from the apparatus and method of the invention can be treated with various known technologies and can be broken down into a reusable by-product through bioreactor reduction technology.

The invention pertains to a solids and liquids effluent chemically enhanced treatment system comprising: (a) a pump for grinding solids and pumping ground solids and liquid effluent; (b) an inlet for introducing flocculant and coagulants into the ground solids and liquid effluent; (c) a mixing chamber having an inlet connected to an outlet of the pump, the mixing chamber having sufficient length to enable the flocculant and coagulants to fully mix with the solids and liquids effluent and form flocs which settle from the liquid effluent; (d) a settling chamber connected to an outlet of the mixing chamber, the settling chamber promoting laminar flow to the solids and liquid effluent and having sufficient length to enable the flocs in the liquid effluent to settle from the effluent; (e) a mechanical propulsion device for moving the solids and liquid effluent through the length of the settling chamber; and (f) a clarifier chamber connected to an outlet of the settling chamber, the clarifier chamber separating flocs from the liquid effluent.

The system can include a surge vessel connected to a solids outlet of the clarifier chamber for collecting solids and liquid effluent. The propulsion device in the settling chamber can be an auger. The mixing chamber and the settling chamber can be tubular. The system can include a decoupling vessel connected with the surge vessel, the decoupling vessel withdrawing liquid effluent from the surge vessel.

The mixing chamber can be sloped to promote gravitational transport of the solids and liquid effluent along the length of the mixing chamber. The mixing chamber can be tubular. The settling chamber can be tubular and elongated. It can have positioned in the interior thereof a rotating auger, the flights of said auger having one or more openings disposed therein. The system can include a pair of settling chambers with respective inlets connected to an outlet of the mixing chamber.

The outlet of the settling chamber can increase in diameter as it connects with the inlet of the clarifier chamber and thereby can reduce the velocity of effluent therein, and encourage the solids to separate from the liquid effluent. The clarifier chamber can be tubular and can be positioned vertically, the diameter of the tubular clarifier chamber being greater than the diameter of the settling tube. The bottom of the clarifier chamber can have a downwardly tapering hollow cone which can collect and draw solids from the liquid effluent in the clarifier chamber. The system can include a valve associated with the hollow cone, the valve opening periodically to enable settled solids to be evacuated from the hollow cone.

The surge vessel can be operated at above atmospheric pressure and the decoupling vessel can be operated at atmospheric pressure. The system can be operated at a pressure of 8 to 20 psig. The system can include an optical sensing device which can sense when the solids have been evacuated from the hollow cone of the clarifier chamber. The system can include a flow control valve between the grinder pump and the mixing chamber inlet, and a mixing valve between the grinder pump and the mixing chamber inlet for mixing flocculant and coagulant with the solids and liquid effluent.

The system can include at least one filter which can process liquid effluent drawn from the clarifier chamber. The filter(s) can be sand filters and/or biofilters. The system can include an ultraviolet treatment unit for radiating liquid effluent obtained from the filter. The system can optionally include an ozone treating unit which can enable ozone gas to be injected into the liquid effluent to sterilize the effluent.

The decoupling vessel can hold liquid effluent taken from the clarifier chamber and the surge vessel for a period of time before the liquid effluent is transported to a liquid effluent filter. Sensors can be located at critical operative locations in the system and the sensors can be monitored and controlled by software operated and controlled by a central computer.

The invention is also directed to a method of treating a solids containing liquid effluent in a chemical enhanced treating system comprising: (a) grinding the solids; (b) adding a flocculant to the ground solids and liquid effluent; (c) pumping the solids containing liquid effluent into an inlet of a mixing chamber connected to the outlet of the pump; (d) transporting the flocculant treated effluent from an outlet of the mixing chamber to an inlet of a settling chamber and settling the solids; (e) transporting the solids containing liquid effluent from an outlet of the settling chamber to an inlet of a clarifying chamber, and separating the solids from the liquid effluent; (f) transporting the separated solids from a solids outlet of the clarifier chamber to a surge vessel and further settling the solids; (g) transporting liquid effluent from a liquid outlet of the clarifier chamber to a decoupling vessel; and (h) transporting liquid effluent from a liquid outlet of the surge vessel to the decoupling vessel.

The method according to the invention can include auguring the solids and liquid effluent through the settling chamber with an auger with openings in flights thereof, the rate of rotation of the auger being coordinated with the flow rate of effluent through the settling chamber. Flow rate through the system can be coordinated with pressure of the system. The flocculant and solids containing effluent can be fully mixed by the time the outlet of the mixing chamber is reached and the flow of the mixed effluent through the settling chamber can be non-turbulent.

Retention time of solids containing effluent in the mixing chamber can be between about 510 seconds at 25 US gal./min. and 840 seconds at 15 US gal./min. Flow velocity through the mixing chamber can be higher than the flow velocity through the settling chamber and the flow rate through the settling chamber can be higher than the flow rate through the clarifier chamber.

BRIEF DESCRIPTION OF THE DRAWINGS

In drawings which illustrate specific embodiments of the invention, but which should not be construed as restricting the spirit or scope of the invention in any way:

FIG. 7 illustrates a side view of the settling tube and clarifier chamber of the closed chemical enhancement treatment system, with solid auger flights.

FIG. 8 illustrates a section view taken along section line A—A of FIG. 7.

FIG. 9 illustrates an end view of the clarifier chamber.

FIG. 10 illustrates a side view of an alternative embodiment of the settling tube and clarifier chamber of the closed chemical enhancement treatment system with perforated auger flights.

FIG. 11 illustrates a section view taken along section line A—A of FIG. 10 with perforated auger flights.

FIG. 12 illustrates a section view taken along section line B—B of FIG. 10, with perforated auger flights.

FIG. 13 illustrates an end view of the clarifier chamber.

FIG. 14 illustrates a stylized side view of a settling tube with auger, with parameters for operation of the settling tube.

FIG. 15 illustrates a stylized end section view of the settling tube with dimension parameters for operation of the settling tube.

FIG. 16 illustrates a stylized end section view of a settling tube with perforated auger flights.

FIG. 17 illustrates a stylized side view of a settling tube with dimension and process operation parameters.

FIGS. 51a through 51g illustrate daily plots of flow in, turbidity in, turbidity out and alum flow obtained by operation of a prototype of the closed chemical enhancement treatment system over a period of seven days.

DETAILED DESCRIPTION OF SPECIFIC EMBODIMENTS OF THE INVENTION

General Description of CCETS Process

Figure 1:
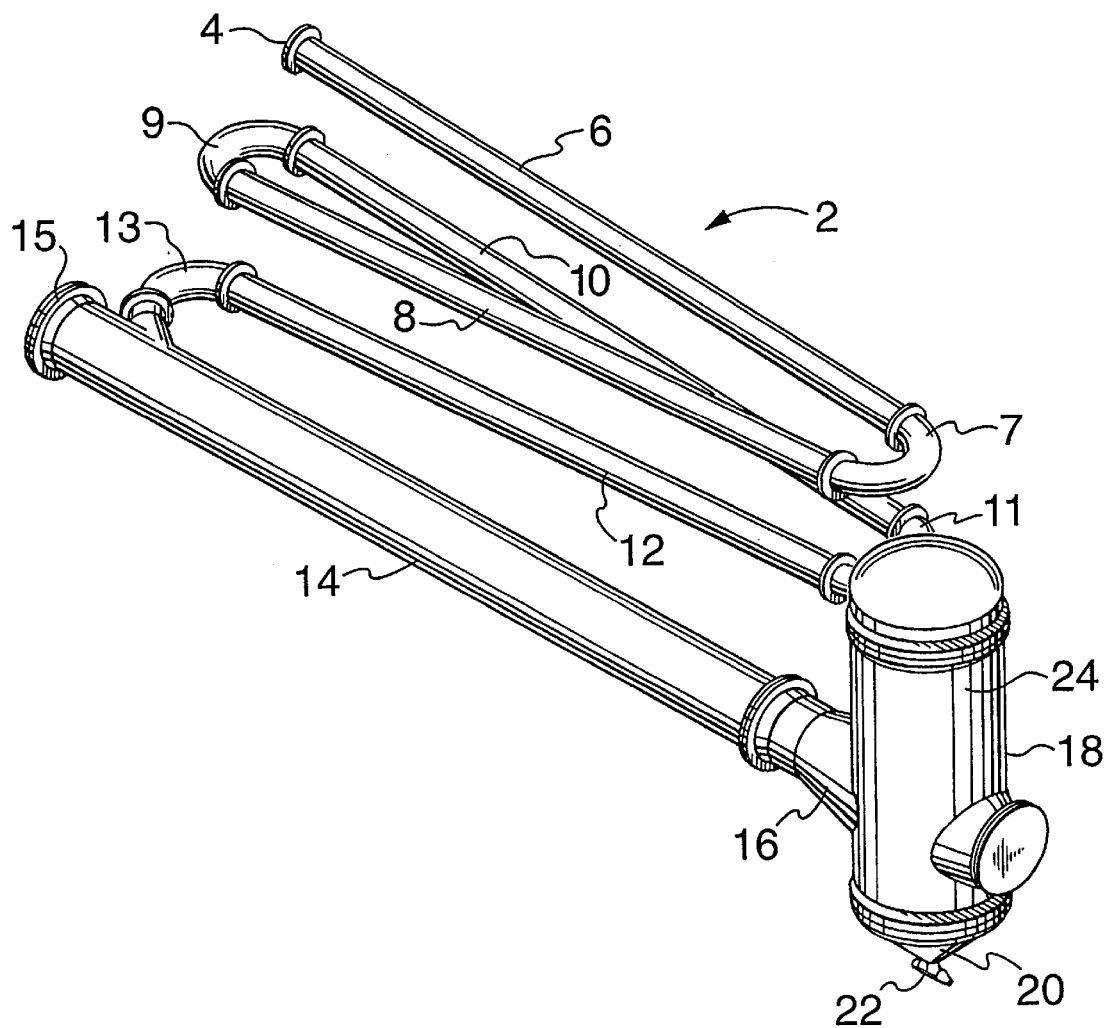
FIG. 1 illustrates an isometric view of the closed chemical enhancement treatment system, including mixing tubes, settling tube and clarifier chamber.

The principal objective of the closed chemically enhanced treatment system (CCETS) is to separate solids (inorganic and organic) from waste liquids using a chemically enhanced physical treatment process. The CCETS according to the invention has been used successfully to treat raw ground sewage to yield an effluent of enhanced primary treatment level. Successful treatment is achieved by a combination of factors:

(1) chemical addition;
(2) coagulation;
(3) flocculation;
(4) sedimentation; and
(5) separation of solids (sludge) and clarified water (effluent).

The treatment occurs in an entirely closed system operating under low pressures. Normal operating pressures of the bulk of the CCETS are typically in the order of 8 to 12 psi. Pressures used maintain positive flow through the process. Since the system is closed, no contact with the waste stream (which may contain harmful bacteria and chemicals) is required by the process operator.

The upstream head of the CCETS system is an inlet pump. If ground wastewater is available, a centrifugal or vortex pump may be appropriate. Otherwise, a grinder pump is necessary. In either case, the pump(s) must be capable of pumping and passing solids, grit and rag materials.

An actuated ball valve positioned after the inlet pump is used to control the flow rate through the system. A suitable chemical coagulant and flocculant aid (typically alum) is preferably injected into the flow of the wastewater stream after the pump but before introduction of the treated wastewater into the inlet of a mixing tube. Injection occurs via a mechanical or hydraulic mixer to promote rapid mixing of the coagulant into the waste stream. Failure to achieve a rapid mix detracts from formation of large, settleable flocs, which in turn drops system performance substantially. As an alternative, the coagulant and flocculent aids can be introduced into the inlet pump.

After rapid mixing, the waste stream flow enters the inlet of the mixing tube, which is a long pipe of relatively large diameter. In this mixing tube (pipe), the wastewater flow regime is turbulent, which thereby promotes slow mixing of the flocculants and coagulants with the solids in the waste stream. Retention time in the mixing tube (or tubes if two or more are used) varies with process flow rate. Approximate retention times are 840 seconds at 15 USgpm and 510 seconds at 25 USgpm.

By the time the waste stream has reached the outlet end of the mixing tube, large dense flocs have formed within the waste stream. The mixing tube is sloped gradually to allow any flocs or grit that settle to the bottom of the tube to continue proceeding through the system. No obtrusive baffles are used. The flow then exits the outlet of the mixing tube and enters the settling tube, which is a horizontal chamber of larger diameter than the mixing tube. This slows down the velocity. Flow velocities in the settling tube are low, thereby inducing a non-turbulent flow regime.

The low velocities in the settling tube generate long residence times and maximum settling of coagulated and flocculated solids from the supernatant. A target ratio of 6.6 between residence time and floc settling time is employed to allow the flocs to settle to the bottom of the tube by the time the outlet is reached.

A slowly rotating auger in the settling tube transports the flocculated settled materials (sludge) to the outlet end of the settling tube where the waste stream then enters a vertical clarifier chamber. In proceeding into the clarifier chamber, the wastewater is channelled through a smooth expanding transition section in the shape of a cone. The sludge settles to the bottom of the clarifier while the clarified effluent (supernatant) proceeds upwardly in the clarifier chamber. The clarifier chamber is of larger diameter than the settling tube and is sized to generate a vertical flow rate that is slower than the settling rates of the flocs. This promotes efficient separation of the solid and liquid phases.

Sludge is evacuated from the system intermittently from the bottom of the clarifier chamber by slowly opening an actuated valve located at the bottom of the clarifier. The intermittent opening is programmed according to process flow rate parameters. The valve closes slowly when an optical sensor detects that solids have passed and clear liquid is being evacuated from the sludge extraction port. This allows the sludge to be emptied effectively and efficiently, so as to minimize solids carryover in the treated effluent being drawn into the upper region of the clarifier chamber. By closing the valve upon optical detection of clear water, dilution of the sludge solids is minimized. Slow opening and closing rates for the sludge extraction valve ensure there are no back pressure "burps" in the CCETS that will disturb solids settling.

Sludge extracted from the bottom of the clarifier chamber flows from the clarifier chamber to a large settling tank. The modest system pressure of 8 to 12 psi is responsible for pushing the waste stream through the CCETS system and for evacuation of the sludge to the settling tank (sludge vessel). The sludge tank is sized to hold solids generated over a desired time, for example, as long as 30 days. Flow enters the sludge tank and is therein retained to allow the solids to settle even more. The solids thicken at the bottom of the sludge tank. Clarified overflow (effluent) from the sludge tank flows to a decoupling tank. The decoupling tank is a collection vessel at the end of the CCETS. The decoupling tank operates at atmosphere pressure conditions, rather than pressures of 8 to 12 psi. Clarified effluent also leaves the CCETS clarifier chamber by way of a small diameter pipe at the top of the clarifier chamber. The effluent passes through an actuated ball valve and into the decoupling tank. The ball valve is adjusted automatically according to CCETS operating conditions to alter the pressure within the CCETS system. Thus clarified effluent from both the clarifier chamber and the sludge vessel are collected in the decoupling tank. Performance of the CCETS system in terms of solids removal efficiency is highly dependent upon the quality of the influent wastewater and the settings of the process controls.

Detailed Description of CCETS System with Reference to Drawings

Referring to FIG. 1, which illustrates an isometric view of an embodiment of the modular closed chemical enhancement treatment system 2, it can be seen that the system comprises a linked series of equipment types which yield a closed chemical enhancement treatment system (CCETS). The CCETS can be mounted on a skid (not shown) so that it is readily portable. The CCETS unit 2 can be constructed of various sizes, but typically, inlet sizes of the mixing tube range from 4 inches to 36 inches. A prototype system with a 4 inch inlet has been found capable of handling about 1,000 gallons of effluent per hour. Larger inlet sizes ranging up to 36 inches are capable of handling thousands of gallons per hour. The unit 2 can be increased in size without experiencing appreciable "up-size" engineering problems.

As seen in FIG. 1, waste stream effluent is introduced into the CCETS unit 2 through inlet 4 of the first mixing tube 6. Before the effluent is introduced into inlet 4, however, the waste stream effluent is pumped through a grinding pump (not shown but see FIG. 2). The grinding pump should be of a type that can grind and pump typical effluent solids such as rags, condoms, sanitary napkins, tampons, diapers, coffee grounds, dirt, and the like. In many situations, the use of two grinding pumps can provide flexibility for the system.

It will be understood that further grinding pumps can be added to the CCETS system, as required, without departing from the spirit and scope of the invention. Also, it will be understood that other types of pumps can be substituted or added. For instance, we have found it is advantageous in certain instances, particularly where there is a highly variable rate of effluent flow, that flocculant chemicals can be added at the inlet of the grinding impeller pump, or at a mixing valve after the pump, either of which provides good up-front mixing. Typical flocculants and coagulants include alum and a flocculant sold under the trade-mark Nalco 8100.

The embodiment illustrated in FIG. 1 is the core of the overall CCETS system and is very versatile. It is capable of handling steady state or highly variable waste stream flow conditions. The ground effluent product expelled from the grinding pump (not shown) is delivered to inlet 4, where the effluent passes into the first of a series of mixing tubes 6. At that point, in the embodiment shown in FIG. 1, further alum, which is a well known solids settling flocculant used in the sewage treatment industry, can be introduced into the mixing chamber 6 through a suitable port (not shown) if required. Also, a coagulant such as Nalco 8100, can be introduced into the ground mixture that is introduced into the upstream end of the mixing tube 6.

One of the process criteria is that the amount of flocculant added is proportional to the rate of flow of waste stream effluent. Flow rates can range from 3 to 25 gallons per minute in a typical case. Higher rates are also possible. The rate of waste stream flow is monitored and the proportionate amount of alum to be added is automatically determined from the flow rate and the other control systems, as will be explained in more detail in another part of this disclosure.

Once the effluent in the first mixing tube 6 reaches the downstream end, it passes around a smooth U-shaped elbow 7. Elbow 7 is connected to the end of tube 6 by suitable flanges. The elbow should be smoothly curved to minimize unwanted turbulence. The effluent then proceeds into the second mixing tube 8. After passing through tube 8, the effluent passes through another U-shaped elbow 9. From there, it passes into tube 10. The process is repeated through elbow 11 and tube 12. At the downstream end of tube 12, the effluent is thoroughly mixed and passes through final elbow 13 into settling tube 14.

The ground waste stream slurry-like effluent, with the added flocculants, is pumped from the upstream end to the downstream end of the mixing tubes 6, 8, 10 and 12 typically under a pressure of 8 to 10 psi and sometimes as high as 20 psi.

Sampling ports located at the beginning and ends of each of the mixing tubes 6, 8, 10 and 12 permit samples to be taken and an assessment made of adequacy of mixing. Sufficient time for full mixing must be provided. If the mixing time is too short, then the number of mixing tubes, or their lengths, can be increased to provide more effluent time in each tube.

It is preferred that mixing tubes 6, 8, 10 and 12 are sloped slightly in a downstream direction, between 1% and 10%. This slope ensures that both the solids and the liquids pass smoothly along the interior of the tubes 6, 8, 10 and 12. If solids are found to accumulate at the bottoms of the mixing tubes 6, 8, 10 and 12, thereby representing a potential maintenance problem, the slope can be increased.

Tubes 6, 8, 10 and 12 are straight tubes and do not have any baffles or other obstructions therein We have found that baffles tend to become clogged with grit and eventually lead to blockage. Of course, as an option, augers or similar devices might be used in the mixing tubes 6, 8, 10 and 12, but the clear sloped tubes have been proven to be effective and trouble free.

While the effluent is being passed through the mixing tube system, 6, 8, 10 and 12, it can be subjected at any point to further treatment, if required, by injecting chemicals into the interior of the tubes by suitable injection points. Anionic and cationic polymers can be added, as the case may be, in order to increase coagulating action and settling action. The polymer attaches to the solids and helps them to collect into lumps (flocs). The lumps (flocs) are typically of sand grain size but can be as large as pea or bean size. Typical anionic polymers useful in the invention are AF409, AF418 and AF06 obtained from Grace Deerborne. Typical useful cationic polymers are KA6400, KA6422 and KA6402, also obtained from Grade Deerborne.

The objective of the invention is to ensure that by the time the ground effluent reaches the downstream end of mixing tube 12, and elbow 13, the flocculants, coagulants and polymers have taken effective action on the effluent and the solids are coagulated, fully mixed and ready for introduction into the upstream end of the settling chamber 14. It is important that the U-shaped elbow 13 connecting the downstream end of tube 12 and the upstream end of settling tube 14 is as smooth as possible, in order to minimize turbulence invading the settling tube 14. In other words, it is important that once the effluent reaches the downstream end of mixing tube 12 and elbow 13, it proceeds smoothly in a reasonable streamlined manner into the upstream end of settling tube 14, in order to promote settling as much as possible.

The diameter of the settling tube 14 should be substantially larger than the diameter of the mixing tubes 6, 8, 10 and 12. This slows down the velocity of the effluent and encourages settling.

The settling tube 14 preferably has a rotating auger therein which is driven by a suitable motor and chain drive (not shown). Another operating condition is that the rotational speed of the auger is proportional to flow rates, as will be explained later. The auger can have solid or perforated flights (see FIGS. 12 to 18). The objective of the settling tube 14 is to achieve tranquil streamlined flow and to permit the flocculated solids in the effluent to settle, as the effluent proceeds from the upstream end to the downstream end of the settling tube 14.

The upstream end of the settling tube 14 has a detachable end plate 15 which can be removed when maintenance on the auger 28 is required. The drive mechanism for the auger is also introduced through end plate 15.

If flow rate conditions being introduced to the CCETS system are slow, only one settling tube 14 is required. On the other hand, if flows are high, two tubes (see FIG. 3) can be used. If effluent flows are very high, then additional mixing and settling tubes can be added along with additional pumps. Solenoid valves can be installed to automatically control and operate valves to open or shut one or more of the settling tubes according to process flow conditions.

At the downstream end of the settling tube 14, the effluent with settled sludge is passed into a flared cone 16 which is connected to a mid-section of a clarifier chamber 18. The clarifier chamber 18 has at the bottom a conical solids drop chamber 20 and a solids release valve 22 at the bottom. The upper portion 24 of the clarifier chamber 18 is cylindrical. While not shown in FIG. 1, observation windows can be installed at various points along the settling tube 14, and the clarifier chamber 18.

The diameter of the clarifier chamber 18 is substantially larger than the diameter of the settling tube 14. This slows down the flow velocity of the effluent and promotes settling action.

When the effluent including settled solids (sludge) has passed through the flared cone 16 and reached the mid-section of the clarifier chamber 18, the solids under system pressure drop into the conical solids drop chamber 20, while the liquid effluent is drawn upwardly into the upper cylindrical part 24 of clarifier chamber 18. The solids which drop into the conical drop chamber 20 are expelled periodically under pressure, as will be explained later in this disclosure. The upward flow rate of effluent in the clarifier chamber 18 must be less than the settling rate or the sludge to the bottom drop chamber 20.

The CCETS system, and particularly the clarifier chamber 18 should be operated under pressure, usually 1.5 to 3.0 atmospheres (8 to 20 psi). The pressure should be sufficient that the solids collected in conical drop chamber 20 can be expelled from time to time, usually every two hours or so, by system pressure acting on the top of the collected solids. The periodic expulsion times are gauged according to rate of solids build-up and effluent flow rates determined by optical sensors and other process controls as explained below.

The relatively solids free liquid effluent obtained from the overhead of the clarifier chamber 18 is of primary treatment quality. Primary treatment is usually defined as the removal of floating solids and suspended solids, both fine and coarse, from raw sewage. The effluent can be pumped to an optional, but usually preferred, atmospheric holding tank (decoupling tank). The holding tank is optional, however, because in some cases, such as remote regions or in industrial applications, the liquid effluent is sufficiently clear and environmentally safe that no further settling action is required, and the effluent can be disposed of. However, in some cases, further treatment may be required and hence an optional holding (decoupling) tank can be installed. The effluent may be pumped from this tank to sand filters, biofilters, ultra violet disinfection and the like. The size of holding tank can be varied to suit operating conditions.

Figure 2:
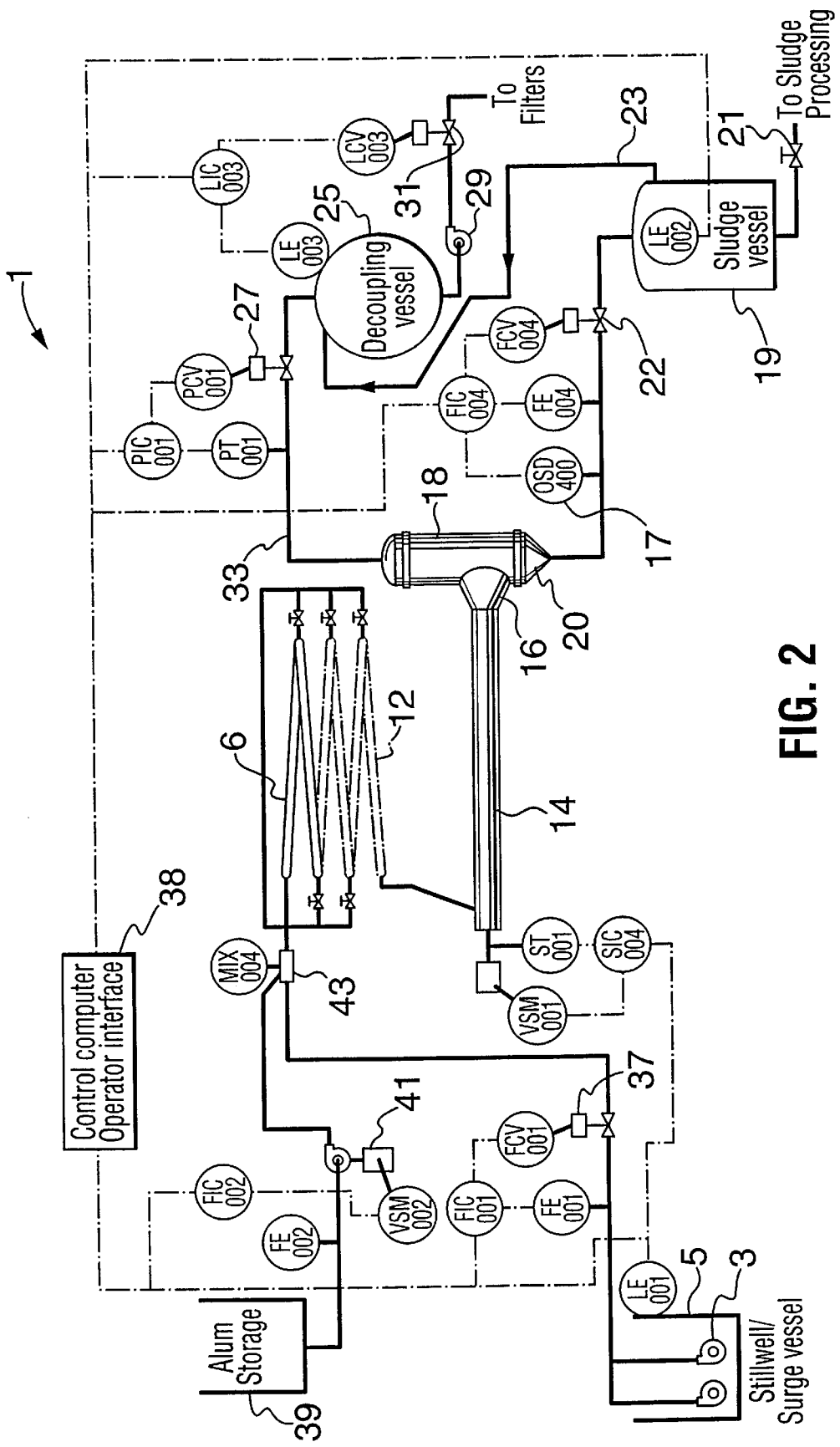
FIG. 2 illustrates a flow sheet of the closed chemical enhancement treatment system with a single settling tube and clarifier chamber.

FIG. 2 illustrates a schematic flow sheet of the overall closed chemical enhancement treatment system CCETS. The waste stream treatment occurs in an entirely closed system operating under relatively low pressures. Low pressures are desirable because they maintain positive flow through the process and eliminate the need and expense of high pressure equipment and design. Normal operating pressures are in the order of 8 to 12 psi, and perhaps as high as 20 psi. The CCETS system 1 includes pressure relief valves which prevent system pressures from exceeding 20 psi. The overall CCETS system 1, which has the CCETS unit 2 (FIG. 1) as its heart, commences with introduction of the effluent to be treated into one or more inlet pumps 3. A pair of pumps 3 are are shown in FIG. 2. The pumps 3 are positioned in a surge vessel 5, into which the effluent waste stream is pumped or flows and is contained.

Such waste stream may be a municipal sewage system or an industrial waste stream. The inlet pump 3 grinds the solids in the effluent waste into a paste and pumps the ground effluent through flow control valve 37 into the inlet of mixing tube 6.

Alum, one of the flocculating chemicals used in the effluent treatment, is held in alum storage tank 39. An appropriate amount of alum is delivered via pump 41 to mixing valve 43, at which point the alum is partially mixed with the effluent being introduced into the inlet of mixing tube 6. Other suitable coagulants and flocculants can be added as well.

Valve 37 can be an actuated ball valve. The mixing valve 43 can be a conventional mechanical or hydraulic mixer which promotes rapid mixing of the flocculant and coagulant with the waste effluent stream. Rapid mixing is important to ensure the downstream formation of large, settleable flocs in the settling tube 14.

After the effluent and flocculant mixture enters the mixing tube 6, it is desirable that the flow be turbulent in order to promote mixing. Retention time in the mixing tubes 6, 8, 10 and 12 varies with process flow rate. Typical retention times range between approximately 840 seconds at 15 U.S. gallons per minute, and 510 seconds at 25 U.S. gallons per minute.

By the time the effluent and flocculating chemicals have been fully mixed with the effluent and solids and reach the end of the last mixing tube 12, large dense flocs have formed within the waste stream. Preferably, the mixing tubes 6, 8, 10 and 12 do not contain baffles (which tend to collect grit, fibres and other solid products in the effluent stream and eventually plug up) and are sloped slightly in a range between 1% and 10%. This slope encourages the flocs and grit to pass along to the bottom of the mixing tubes, and into the inlet end of the settling tube 14. If there is no slope, the solids tend to stagnate on the bottom of the mixing tubes. The settling tube 14 should be horizontal and should have a diameter which is considerably larger than the diameter of the mixing tubes 6, 8, 10 and 12. Furthermore, the introduction of the waste stream from the outlet end of mixing tube 12 through elbow 13 and into the inlet end of settling tube 14 should be as smooth as possible. This minimizes turbulence. Furthermore, since the settling tube 14 has a larger diameter than the fourth mixing tube 12 (or the last mixing tube), the flow velocity of the waste stream slows considerably. The objective is to have flow velocities in the settling tube 14 as low as possible, while at the same time yielding a non-turbulent flow pattern. The low flow velocities in the settling tube 14 generate long residence times. A target ratio of 6.6 between resident time and floc settling time is employed to allow the flocs to settle to the bottom of the settling tube 14.

As explained previously, a slowly rotating auger 28 in the settling tube 14 transports the settled solid materials (sludge) to the downstream end of the settling tube 14, at which point the waste stream passes through the flared cone 16 into the clarifier chamber 18. The waste water with settled materials (sludge) is channelled into the expanding cone 16, to slow down velocity and thereby create a smooth transition section into the clarifier chamber 18. In the clarifier chamber 18, the sludge in the waste stream settles to the bottom and into the conical solids drop chamber 20.

The clarifier chamber 18 must be designed so that it is of sufficient size to generate vertical flow rates that are lower than the settling velocities of the flocs in the clarifier chamber 18. Otherwise, the flocs will tend to be conveyed upwardly into the upper regions of the clarifier chamber 18, thereby retarding efficient separation between the solid and liquid phases of the effluent stream.

Settled sludge, which collects in the conical solids drop chamber 20, is intermittently removed by opening an actuated valve 22 located at the bottom of the conical drop chamber 20. While the sludge is passing through, an optical sensor device 17 detects darkness and remains static. However, when the optical sensor device 17 detects the point when clear effluent liquid starts to become evacuated from the bottom of the solids drop chamber 20, the optical sensor device 17 then signals the valve 22 to slowly close, thereby terminating further evacuation. This prevents dilution of the sludge with clear effluent.

It is important that the valve 22 opens slowly and also closes slowly. This prevents sudden drops or increases in pressure in the CCETS system, and back pressure reverberations ("burps") into the clarifier chamber 18, and the settling tube 14. Such back pressure reverberations tend to interrupt smooth settling of the flocs and sludge from the liquid effluent.

Utilizing an optical sensor device 17 permits the sludge to be emptied effectively from the bottom of the solids drop chamber on an intermittent basis, and minimizes solids carryover into the treated clear effluent in the upper region of the clarifier chamber 18. Also, closing the valve 22 on optical detection of clear water of minimum turbidity minimizes dilution of the sludge.

The sludge that is evacuated from solids drop chamber 20 is conveyed into a large sludge vessel 19. The sludge vessel 19 is preferably sized to hold the solids generated over a specified time, for example, 30 days The flow of sludge via valve 22 enters the sludge vessel 19 and is retained therein to allow the solids to settle and thicken at the bottom of the tank. The thickened solids are periodically removed via valve 21. Clarified liquid effluent in the sludge vessel 19 is conveyed via transmission line 23 into decoupling vessel 25.

Clarified effluent drawn from the top of clarifier chamber 18 is conveyed by line 33 through valve 27 into decoupling vessel 25. Valve 27 is preferably a pressure control valve which maintains a specified process pressure upstream of the valve 27 and atmospheric pressure below the valve. The decoupling vessel 25 is a collection vessel at the end of the CCETS system and operates at atmospheric pressure. Decoupling vessel 25 serves as a type of surge tank and enables the CCETS system to be hooked up with downstream secondary treatment facilities which typically operate at atmospheric pressure. The liquid effluent contents of the decoupling vessel 25 are conveyed via pump 29 through liquid control valve 31, and ultimately to the secondary treatment system.

Valve 27, through which the clarified effluent (supernatant) from the top of clarifier chamber 18 is conveyed, is preferably an actuated ball valve. The ball valve 27 is adjusted automatically by the CCETS system controls (control computer 38) to alter and regulate pressures throughout the system.

As illustrated in FIG. 2 via dotted lines, there are a number of electrical connections to various pieces of equipment through which the various pressure controls, flow controls, and volume controls are centrally operated from a central control computer 38.

An important use of sludge vessel 19, and the decoupling vessel 25, other than to provide additional settling time, is that they can serve as buffers against downstream conditions, such as a conventional treatment plant. Sensors are placed in the vessel 19 to monitor the level of fluid in the vessel 19. It is preferable to try to operate the level of liquid in vessel 19 between an acceptable high and low level. This can be done by linking the sensors to the discharge pumps as shown in FIG. 2. A level control in vessel 19 provides consistency to the overall CCETS system and facilitates easier handling and operation.

An optional feature of the invention is the use of ultraviolet treatment to in effect kill all bacteria (for instance, *E-coli*), and sterilize the liquid effluent. A typical system incorporates three optional UV tubes. The liquid effluent is passed through these tubes after the liquid effluent has passed through the filters. The UV tubes typically are constructed of hollow tubes with ultraviolet lamps in each tube to thereby radiate the liquid effluent with ultraviolet radiation and thereby sterilize the liquid effluent.

A further option is to introduce ozone ($O_3$) into the liquid effluent. The ozone is used in the same way as the ultraviolet. The ozone treatment should be located immediately prior to discharge of the treated effluent. The ultraviolet tubes can be controlled by conventional ultraviolet controls in control computer 38. The control computer 38 also contains instrumentation and electrical equipment which is tied to the sensors and fittings, which are used to monitor and control all aspects of the CCETS system. Typically, the closed chemical enhancement treatment CCETS system 1 is controlled by a computer which is located proximate to the system 1, at a location where an operator works. Alternatively, the CCETS system 1 can be controlled remotely over long distances, such as long distance telephone lines. For instance, the CCETS system 1 can be installed in one city, and can be monitored at headquarters located in a separate city. In fact, a series of systems 1 can be deployed at various locations throughout a geographical area, and each can be controlled from a master control centre via long distance telephone lines and a master computer control.

Performance of the CCETS system regarding efficient solids removal is highly dependent upon the quality of the influent waste water and the proper settings of the various controls. The CCETS system is sophisticated and optimal treatment of any typical waste stream is possible by carefully monitoring and refining parameters such as:

(1) Mixing time. (This can be regulated by adjusting the length and number of mixing tubes.

(2) Flow control valve settings at critical points in the CCETS system.

(3) Adjusting pressure control valve settings to regulate pressure at various critical points in the CCETS system.

(4) Adjusting and regulating auger rotation speed in the settling tube in order to regulate fluid flow through the settling tube.

(5) Selecting appropriate types of coagulants and flocculants suitable for the specific type of effluent waste being treated by the CCETS system.

(6) Monitoring and regulating concentrations and injection rates of chemical coagulants and flocculants.

(7) Regulating timing between sludge evacuations from solids drop chamber.

(8) Adjusting length of time of evacuations from the solids drop chamber.

(9) Selecting sludge tank size.

(10) Regulating effluent flow division between respective settling tubes in CCETS systems which utilize two or more settling tubes per individual mixing tube system.

Figure 3:
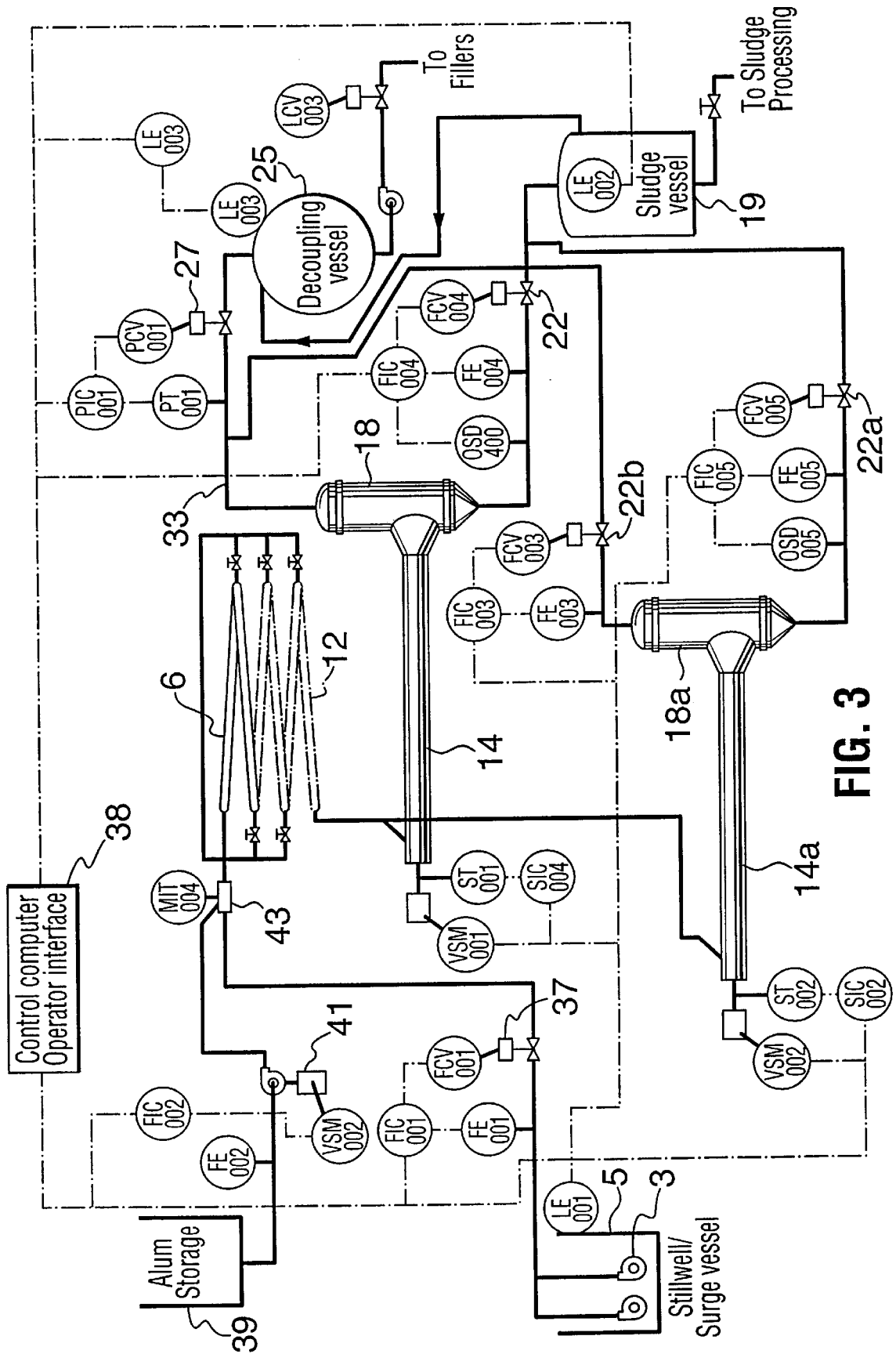
FIG. 3 illustrates a flow sheet of a chemical enhancement treatment system utilizing a parallel pair of settling tubes and clarifier chamber.

FIG. 3 illustrates a schematic flow sheet of an alternative CCETS system which employs two settling tubes for a single series of mixing tubes. In most respects, the system illustrated in FIG. 3 is the same as that illustrated in FIG. 2, and discussed previously. However, FIG. 3 illustrates a modification of the single mixing tube, single settling tube CCETS system by incorporating two settling tubes 14 and 14a and clarifier chambers 18 and 18a connected in parallel between the outlet end of the last mixing tube 12 and the sludge vessel 19 and decoupling vessel 25. FIG. 3 illustrates settling tube 14 and second settling tube 14a connected at their respective inlet ends to the outlet end of mixing tube 12. The outlet ends of two settling tubes 14, 14a are connected to their respective clarifier chambers 18 and 18a. The sludge flow from the bottom of clarifier 18 is controlled by flow control valve 22, as discussed previously. In similar fashion, the sludge removal from the bottom of clarifier chamber 18a is controlled by second flow control valve 22a. The effluent (supernatant) overflow from the top of clarifier 18a is controlled by third flow control valve 22b.

In certain cases, in dealing with specific types of effluent waste treatment, it may be advantageous to have extra settling capacity for each set of mixing tubes. The length and number of the series of mixing tubes can be increased as required in order to obtain proper mixing of the coagulants and the waste stream. Therefore, only one string of mixing tubes is required. However, if waste stream flow rates are great, then one settling tube and clarifier chamber may not suffice. In such cases, a dual system comprising a second parallel settling tube 14a and a second clarifier chamber 18a, as illustrated in FIG. 3, may be desirable. Indeed, in some cases, it may be advisable to set up a parallel system comprising parallel sets of mixing tubes, settling tubes and clarifying chambers In each case, the additional mixing tubes, settling tubes and clarifier chambers are connected in parallel.

In operating a modified CCETS dual system as illustrated in FIG. 3, which has two settling tubes 14 and 14a and two respective clarifier chambers 18 and 18a, it is important to endeavour to maintain even flow rates through the respective settling tubes 14 and 14a. This means that the fluid mechanics and hydraulics for each settling tube and clarifier chamber must be commensurate with one another. In order to assist in obtaining and regulating even flow rates, the use of four flow valves 22, 22a, 22b and 27 are advisable, as illustrated in FIG. 3.

The sludge from clarifier chamber 18, evacuated by valve 22, need not necessarily take place at the same 25 time that the sludge from clarifier 18a is evacuated via valve 22a. Sludge evacuation can take place separately or simultaneously, whichever is preferred in order to optimize operation and performance of the dual settling tube modified CCETS system as illustrated in FIG. 3.

Referring to FIG. 3, the liquid effluent from first and second clarifier chambers 18 and 18a can be either optionally drawn directly, or as seen in FIG. 3, via vessel 19 and decoupling vessel 25, delivered by pumps to a series of downstream conventional filters (not shown). Such filters are conventional and typically contain multi-sand arranged in layers from coarse to fine, as is typical in the water effluent filtering art.

In some cases, the effluent obtained from clarifier chambers 18 and 18a is sufficiently clear that the liquid effluent can be delivered directly to the location where it is either recycled or disposed of. When installed in the CCETS unit 2, however, a series of filters greatly clarify the liquid effluent and remove essentially all remaining solids which, in many cases, are minimal.

By using a dual system or a parallel system comprising a combination of multiple lengths of mixing tubes, or two or more parallel mixing tubes, and double, triple or a higher number of settling tubes, or parallel systems of each train, the CCETS system according to the invention can be designed to handle waste streams in the range of 1,000 to 1,000,000 gallons per day. Furthermore, the CCETS system according to the invention is compact in operation, relatively odour free, relatively silent in operation, and can be readily housed in any building in a specific neighbourhood. The CCETS system does not present a large unsightly unattractive waste disposal facility which must be hidden away, as is the case with conventional waste disposal systems. Indeed, the CCETS system according to the invention can be housed in a building in the middle of any urban community, park, or beside a lake, river, or virtually any setting.

Figure 4:
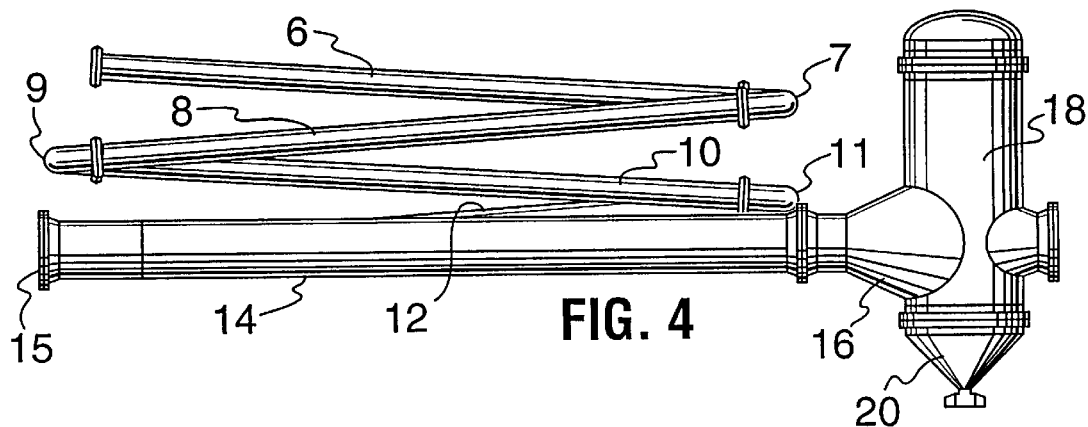
FIG. 4 illustrates a side view of the closed chemical enhancement treatment system.
Figure 5:
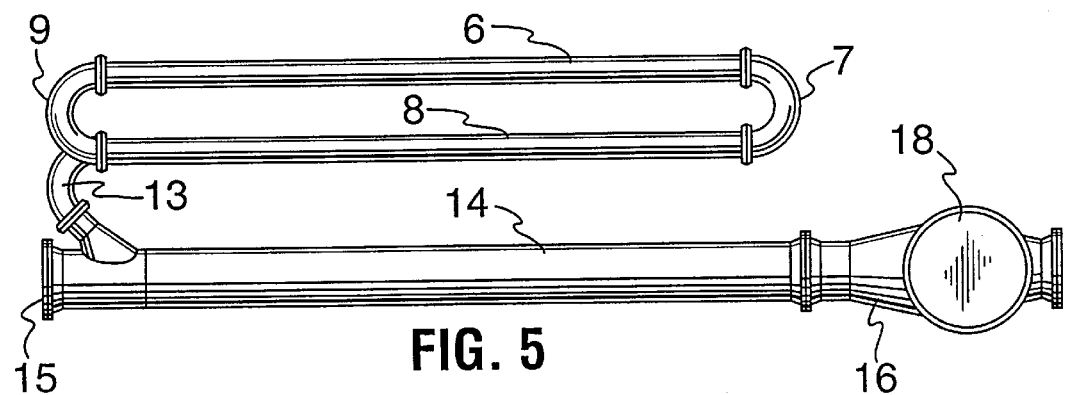
FIG. 5 illustrates a plan view of the closed chemical enhancement treatment system.
Figure 6:
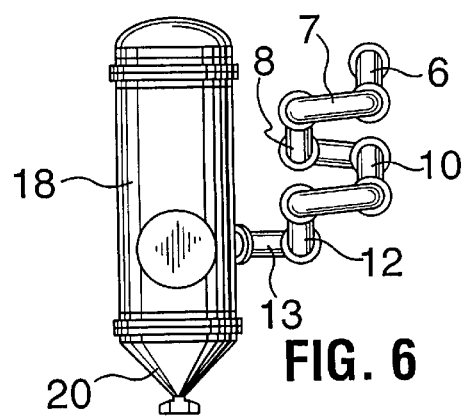
FIG. 6 illustrates an end view of the closed chemical enhancement treatment system.

FIGS. 4, 5, and 6 illustrate side, plan and end views respectively of the CCETS unit 2, illustrated isometrically in FIG. 1. FIG. 4 illustrates the sloped first mixing tube 6, the second sloped mixing tube 8, the third sloped mixing tube 10, and the fourth sloped mixing tube 12, connected together in a traversing or switchback arrangement by elbows 7, 9 and 11. The outlet end of the fourth mixing tube 12 connects with the inlet end of settling tube 14 by elbow 13 (not shown). The downstream outlet end of settling tube 14 is connected by flared cone 16 to a mid-region of clarifier chamber 18. The clarifier chamber 18 has a conical solids drop chamber 20 at the bottom thereof. The slopes of mixing tubes 6, 8, 10 and 12 should be calculated to ensure a smooth gravitationally assisted flow of the waste stream being passed through the mixing tubes 6, 8, 10 and 12. The ensures full mixing of the flocculants and waste stream by the time the inlet end of settling tube 14 is reached. The slope of the mixing tubes 6, 8, 10 and 12 can be adjusted to satisfy specific waste stream requirements.

In the plan view illustrated in FIG. 5, it will be noted that the elbows 7, 9 and 11 are smoothly rounded in order to promote smooth uninterrupted flow and mixing action throughout the series of mixing tubes 6, 8, 10 and 12. Furthermore, as evident in FIG. 5, the elbow 13 that connects the outlet end of fourth mixing tube 12 to settling tube 14 is smoothly configured to provide a smooth introduction of the mixed waste stream into the inlet end of settling tube 14. It has been found that if the waste stream and coagulant mixture being introduced from the end of fourth mixing tube 12 and into the inlet end of settling tube 14 is not smooth, then unwanted fluid wave patterns are created throughout the length of settling tube 14. These wave patterns interfere with the smooth solids settling action that is desirable when settling tube 14 is properly operating, and the rotational speed of the auger 28 is synchronized.

FIG. 6 illustrates an end view of the stacked switch back tier of mixing tubes 6, 8, 10 and 12 connected to clarifier chamber 18. By being able to stack the mixing tubes as shown in FIGS. 4, 5 and 6, it is possible to create a highly compact CCETS unit 2, which can be deployed in any reasonably small space. Thus, unlike conventional waste disposal treatment systems, vast areas are not required in order to accommodate the CCETS unit 2 according to the invention.

FIGS. 7 and 8 illustrate side and end section views of the settling tube 14 and clarifier chamber 18 FIG. 9 illustrates an end view of the clarifier chamber 18. Observation windows 26 can be constructed at spaced locations in the settling chamber tube 14 and clarifier chamber 18. The interior of the settling tube 14 houses a rotating auger 28 (shown in dotted lines in FIG. 7) which is driven by a suitable motorized system such as a chain drive. Other types of conventional drives are feasible, such as gears, belts, and the like. The flights of the auger 28 illustrated in FIG. 7 are solid. However, then can have drilled therein a series of circular openings which permit the liquid and solids mixture comprising the effluent to work back and forth through the flights of the auger 28 as the effluent is slowly propelled along the length of the tube 18. The auger 28 and flow rates should achieve basically a laminar or tranquil settled orientation by the time the effluent reaches the downstream end of the settling tube 14. This encourages solids separation.

At the downstream end of the settling tube 14, the effluent passes into a flared cone 16 which connects with the mid-section of the clarifier chamber 18. The clarifier chamber 18 has a large vertical cylindrical configuration, a large part of which extends upwardly from the flared cone 16 and the downstream end of the settling tube 14. The clarifier chamber 18 has a conical solids drop chamber 20 which extends downwardly and immediately below the large cylindrical part of the clarifier chamber 18. The operation of the clarifier chamber 18 and solid drop chamber 20 combination is very important and contributes greatly to the solids separation effectiveness of the CCETS unit 2. The solids drop chamber 20 is constructed in the shape of a hollow inverted cone in order to concentrate the solids towards the bottom of the cone 20. In many cases, such as when variable effluent flow-rates are encountered, the conical design is preferred for promoting tranquil conditions and encouraging downward solids separation.

The flared cone 16 between the downstream end of the settling tube 14 and the clarifier chamber 18 has the effect of reducing the rate of flow of the liquid effluent as it emerges from the end of the mixing tube 18 and passes into the main clarifier chamber 18. This flaring action and reduced flow rate encourages the solids in the effluent to settle from the liquid and drop downwardly into the conical solids drop chamber 20.

FIG. 9 illustrates an end view of the clarifier chamber 18. As can be seen, the large cylindrical portion is positioned directly above the downwardly extending conical solids drop chamber 20. Observation windows 26 on each side of the main body of the clarifier chamber 18 are visible. On each side of the clarifier chamber 18 and drop chamber 20, there are flow control valve combinations, pressure control valves, pressure gauges, and the like, which assist in controlling the operation of all components. Thus, by use of the appropriate controls, respective pressures between the clarifier chamber 18 and the drop chamber 20 and other components can be monitored and controlled.

FIG. 10 is similar to FIG. 7 discussed previously and illustrates a side view of a settling tube 30 and clarifier chamber 32 with an auger 34 which has holes 36 therein. FIG. 11 illustrates a section view taken along section line A—A of FIG. 10. FIG. 12 illustrates a section view taken along section line B—B of FIG. 10. FIGS. 11 and 12 show clearly the circular openings 36 that are drilled or formed in the flights of the auger 34, in a spatial pattern throughout the length of the auger 34. These holes 36 enable flow of effluent through the flights of the auger 34 in the settling tube 30 to achieve a laminar or tranquil settling action on the solids as the effluent passes from the upstream end to the downstream end of the settling tube 30. This tranquil action is encouraged by the slow rotation of the auger 34 and the perforated flights.

Figure 18:
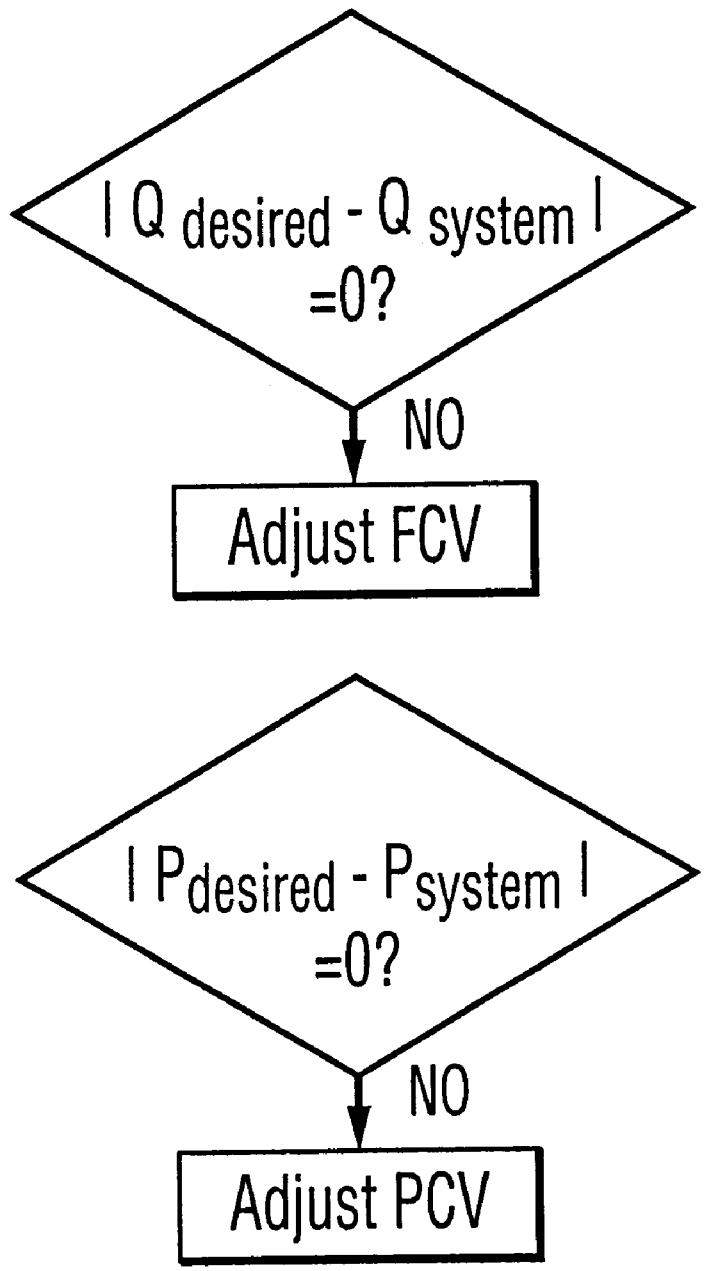
FIG. 18 illustrates a schematic of a system flow rate/pressure algorithm for operating the closed chemical enhancement treatment system.

FIG. 18 for completeness illustrates an end view of the clarifier chamber 32. It is of similar design to the clarifier chamber 18 discussed above in relation to FIGS. 7, 8 and 9.

FIG. 14 illustrates a stylized depiction of relevant process and dimension parameters relating to the settling tube 14 and auger 28 configuration. The angle of the auger flights is denoted by a "e" sign, the pitch of the flights by the letter "P" and the flow of the waste water stream through the settling tube 14 by the letter "Q". The length of the settling tube 14 is denoted by "L".

FIG. 15, which depicts an end section view of the settling tube 14 and auger flight 28, depicts the operating dimension parameters for diameter denoted as "D". diameter of auger shaft denoted by "d", internal diameter of mixing tube 14 denoted by "F" and rotational speed of the auger 28 by the letter "ω". FIG. 16 illustrates an end section view of the settling tube 14 with an auger 34 with auger holes 36 therein. The auger holes 36, as shown in FIG. 16, are relatively large and take up approximately 39% of the flight area of the auger 34.

FIG. 17 illustrates a stylized side view of a settling tube 14 and operating parameters for settling solids in the settling tube. Flow rate of the waste stream is indicated by "Q". The length of the settling tube 14 is denoted by the letter "L", while the diameter is denoted by the letter "D". Lateral velocity is denoted by "$V_S$", while linear velocity of the waste stream is denoted by "$V_X$". The relationship between flow "Q" time denoted by "T", diameter denoted by "D" and length denoted by "L" is calculated by the equations $Q=AV_X$, $D=V_S T_S$ and $L=V_S T_S$. If the time "T" in the tube 14 is sufficient, then $T=T_S$. Velocity in a lateral direction as indicated by arrow $V_S$ is assumed to be known. These parameters, and the significance thereof in operating the CCETS system at optimum efficiency, are discussed in more detail later in this specification.

Figure 19:
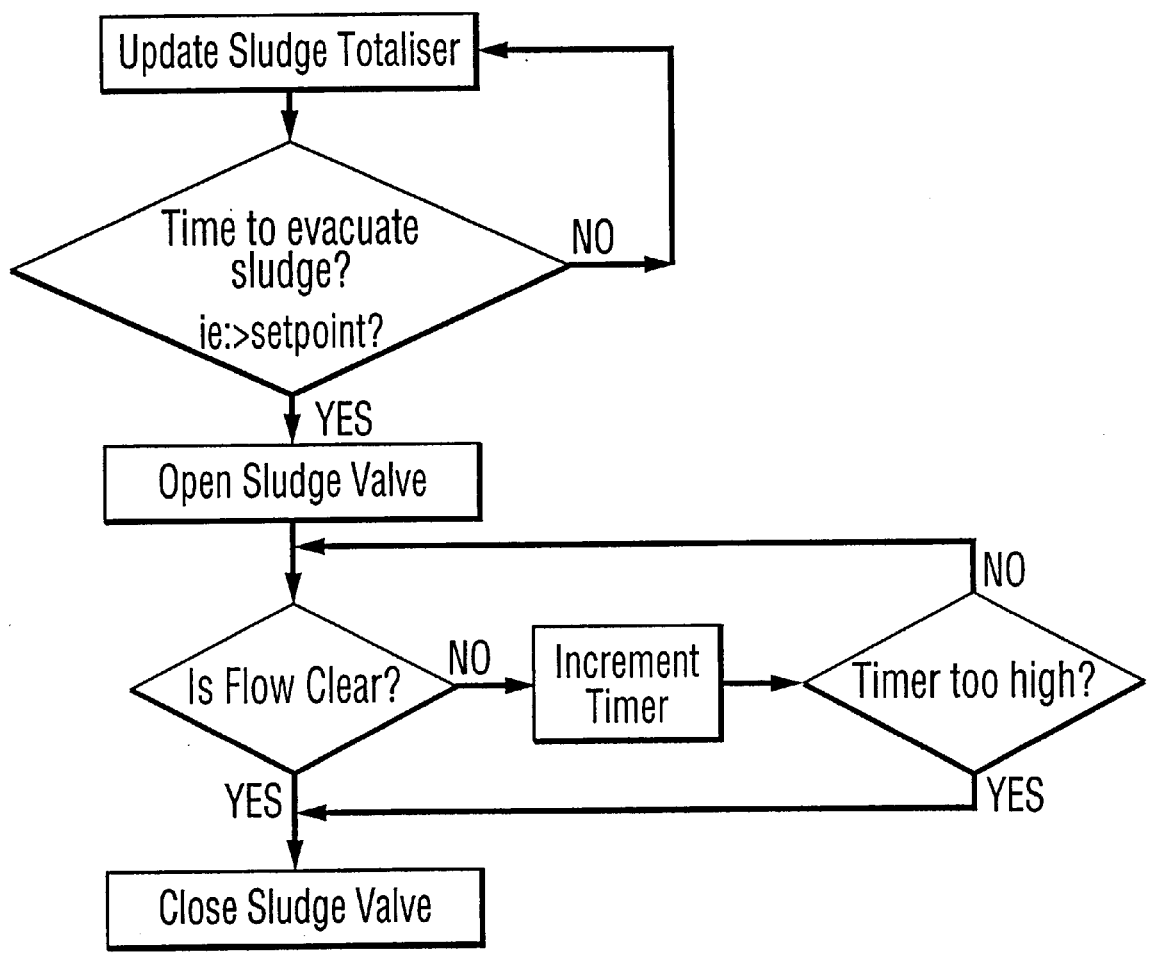
FIG. 19 illustrates a schematic of a sludge dump algorithm for operating the closed chemical enhancement treatment system.
Figure 20:
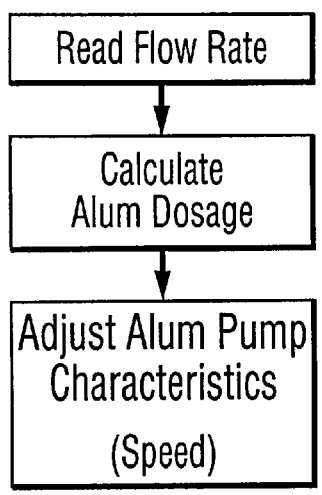
FIG. 20 illustrates a schematic view of an alum injection algorithm for operating the closed chemical enhancement treatment system.
Figure 21:
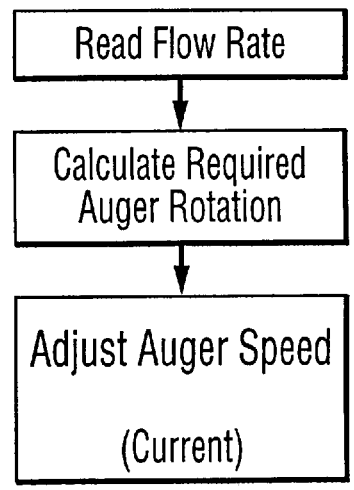
FIG. 21 illustrates a schematic view of an auger rotation algorithm for operating the closed chemical enhancement treatment system.
Figure 22:
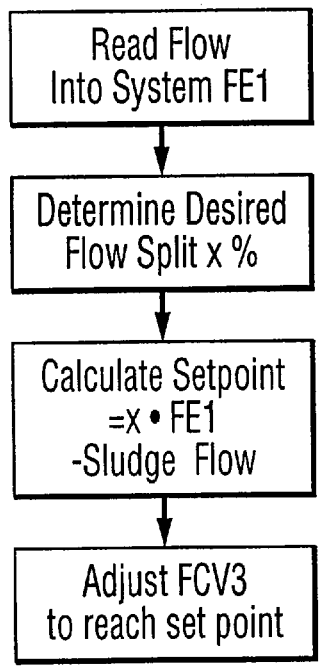
FIG. 22 illustrates a schematic view of a flow balancing algorithm (multiple tube system) for operating the closed chemical enhancement treatment system

FIG. 18 illustrates a schematic of a system flow rate/pressure algorithm for operating the closed chemical enhancement treatment system. Process operating parameters are shown in the legend at the upper left of FIG. 18. FIG. 19 illustrates a schematic of a sludge dump algorithm for operating the closed chemical enhancement treatment system. FIG. 20 illustrates a schematic of an alum injection algorithm for operation of the closed chemical enhancement treatment system. FIG. 21 illustrates a schematic of an auger rotation algorithm for operation of the closed chemical enhancement treatment system. FIG. 22 illustrates a schematic of a flow balancing algorithm (multiple tube system) for operating the closed chemical enhancement treatment system of the type illustrated and discussed previously in connection with FIG. 3.

CCETS System Operating Criteria and Controls
System Flows—FIT/FE 001
Surge or Stillwell Level—Lt-001

The setpoint is calculated by liquid level in the surge (sludge) vessel 19. A level transmitter converts an ultrasonic signal (time of flight) which finds the air/water interface in the vessel 19. Programmed into the transmitter are the dimensions distance from the sensor face to the bottom of the vessel 19 and the distance from the bottom of the vessel to 100% liquid level in the vessel 19. The transmitter then transmits a proportional current signal to the controller 38.

The current signal is 4–20 ma (milli-amps) driven by 24 vdc supply.

Max current signal=20 ma
Elevated zero=4 ma
Range=16 ma
The controller is using a 12 bit A/D converter.
Max digital=4095
Elevated zero=819
Digital Range=3276
US gallons in vessel=pi*r^2*h*7.4805.
pi=3.14156 ect.
r=radius in feet
h=height in feet
7.4805=factor to convert ft^3 to US gallons
Conversion from current to digital:
Digital=(((Mets.Lt2 signal-4)/16*3276)+819)

Conversion from digital to gallons:

Mets,Lt2_gal=(((digital-819)/3276)*US gallons in vessel

The flow in setpoint is calculated by Mets.It2_gal/Derv_time. Derv-time is entered by the site engineer.

Process Flow Rate

The process flow value is measured by using a magnetic flow meter which measures the fluid velocity by means of magnetic induction and the effects of the fluid velocity on the pulsed field. The diameter of the flow tube is known.

US GPM=Fluid velocity * CSA * 7.4805

Fluid velocity=velocity in ft/min.

CSA=cross-sectional area of the flow tube=pi*r^2 pi=3.14156 ect.

r=radius of flow tube in feet 7.4805=factor to convert ft^3 to US gallons

Depending on the magnetic flow meter's manufacturer, the accuracy can be 0.5% of range down to 0.3% of the flow curve. For calculating flows, the meter should be in the linear portion of the flow meter's performance curve.

The current signal is 4–20 ma (milli-amps) driven by 24 vdc supply.

Max current signal=20 ma

Elevated zero=4 ma

Range=16 ma

The controller is using a 12 bit A/D converter.

Max digital=4095

Elevated zero=819

Digital range=3276

The controller uses the calculated setpoint and process value in the Pid algorithm:

$$M=K * e+K/T\, e\, dt-K * R * dpv/dt+ms$$

M=Controller output

K=Proportional gain—entered by engineer e=error (setpoint—process value)

T=reset time—entered by engineer dt=differential time

R=rate gain—entered by engineer dpv=differential process value dpv/dt=rate of change of the process value with respect to time ms=constant The controller 38 sends a proportional current signal to the flow control valve 37 to position the valve so that setpoint=process value.

Alum Flow—FIT/FE 002

The alum flow setpoint is calculated from a ratio entered by the operating engineer and the flow_in to the CCETS unit to give ml/min.

Alum setpoint=flow_in * ratio

Flow_in=CCets flow in, in L/min

Ratio=Engineer entered

The alum process value is measured by using a magnetic flow meter 41 which measures the fluid velocity by means of magnetic induction and the effects of the fluid velocity on the pulsed field. The diameter of the flow tube is known.

US GPM=fluid velocity * CSA * 7.4805

Fluid velocity=velocity in ft/min.

CSA=cross-sectional area of the flow tube=pi*r^2 pi=3.14156 ect.

r=radius of flow tube in feet 7.4805=factor to convert ft'to US gallons

Depending on the magnetic flow meter's manufacturer, the accuracy can be 0.5% of range down to 0.3% of the flow curve. For calculating flows the meter will be in the linear portion of the flow meter's performance curve.

The current signal is 4–20 ma (milli-amps) driven by 24 vdc supply max current signal=20 ma elevated zero=4 ma range=16 ma The controller 38 uses the calculated setpoint and process value in the Pid algorithm.

max digital=4095 elevated zero=819 digital range=3276

The controller 38 also uses the calculated setpoint and process value in the Pid algorithm.

$$M=K * e+K/T\, e\, dt-K * R * dpv/dt+ms$$

M=Controller output

K=Proportional gain—entered by engineer e=error (setpoint—process value)

T=reset time—entered by engineer dt=differential time

R=rate gain—entered by engineer dpv=differential process value dpv/dt=rate of change of the process value with respect to time ms=constant The controller 38 sends a proportional current signal to the variable speed pump so that setpoint process value.

Sludge Flow—FIT/FE 004, Dual Tube FIT/FE 005

Sludge flow starts are calculated by a totalizer on the Flow_in flow meter, when a predetermined amount of flow has passed through the CCETS a sludge flow starts. The algorithm to adjust the setpoint of the PID flow loop is ASP=(Sludge maximum*0.01)+OASP ASP=actual setpoint OASP=old actual setpoint Sludge maximum=engineer entered When the sludge dump 22 is started, the computer 38 transfers the max setpoint in and we can start calculating the algorithm once every three seconds. By executing the function every three seconds, the rate the setpoint rises and falls can be controlled. The end of the sludge dump is determined by an optical device 17 that detects how dark the effluent is. When the sludge dump starts, the light from the optic is blocked and as the sludge evacuates from the solids drop 20, the sludge thins. The light then reaches the sensor and trips the optic 17. When this occurs, the computer 36 transfers a 0 into the sludge maximum. The algorithm gives a reverse curve to the opening curve.

The sludge flow process value is measured by using a magnetic flow meter which measures the fluid velocity by means of magnetic induction and the effects of the fluid velocity on the pulsed field. The diameter of the flow tube is known.

US GPM=Fluid velocity * CSA * 7.4805

Fluid velocity=velocity in ft/min.

CSA=cross-sectional area of the flow tube=pi*r^2 pi=3.14156 ect.

r=radius of flow tube in feet 7.4805 factor to convert ft^3 to US gallons

Depending on the magnetic flow meter's manufacturer, the accuracy can be 0.5% of range down to 0.3% of the flow curve. For calculating flows the meter will be in the linear portion of the curve.

The current signal is 4–20 ma (milli-amps) driven by 24 vdc supply.

max current signal=20 ma
elevated zero=4 ma
range=16 ma
The controller 38 is using a 12 bit A/D converter.
max digital 4095
elevated zero=819
digital range=3276

The controller uses the calculated setpoint and process value in the Pid algorithm.

$$M=K * e+K/T e\ dt-K * R * dpv/dt+ms$$

M=Controller output
K=Proportional gain—entered by engineer
e=error (setpoint—process value)
T=reset time—entered by engineer
dt=differential time
R=rate gain—entered by engineer
dpv=differential process value
dpv/dt=rate of change of the process value with respect to time
ms=constant The controller 38 sends a proportional current signal to the control valve to position the valve so that setpoint=process value.

System Pressure—PT 001

The system pressure is measured by a pressure sensing device (see FIG. 2) that uses a Capacitance sensor that changes capacitance output proportionally to the defection of the sensor membrane. The electronics in the pressure transmitter convert this change in capacitance to a 4 to 20 ma signal.

The current signal is 4–20 ma (milli-amps) driven by 24 vdc supply.
max current signal=20 ma
elevated zero 4 ma
range 16 ma
The controller 38 uses a 12 bit A/D converter.
max digital=4095
elevated zero=819
digital range=3276

The controller 38 uses the calculated setpoint and process value in the Pid algorithm.

$$M=K * e+K/T e\ dt-K * R * dpv/dt+ms$$

M=Controller output
K=Proportional gain—entered by engineer
e=error (setpoint—process value)
T=reset time—entered by engineer
dt=differential time
R=rate gain—entered by engineer
dpv=differential process value
dpv/dt=rate of change of the process value with respect to time
ms=constant The controller 38 sends a proportional current signal to the pressure control valve 27 to position the valve so that setpoint=process value.

Auger Rotation and Control—SI 001, Dual Tube SI 002

The sensor for auger rotation (see FIG. 2) is an optic that detects the speed of a rotating shaft that is half painted white and half painted black. This pulse is sent to the control computer 38 and integrated into revolutions per min. It is then used as the process value for the PID algorithm. The setpoint is determined by a calculation of the velocity of the flow into the settling tubes 18. The following calculation is used:

Fluid velocity=(Flow_in/7.4805)/CSA
Fluid velocity in ft/min.
Flow_in in US gallons per minute
CSA=cross-sectional area of the flow tube=pi*r^2
pi=3.14156 ect.
r=radius of flow tube in feet
7.4805=factor to covert US gallons to ft^33

The flight spacing P on the auger 28 is known so 1 revolution will move "x" feet per min. This factor determines the RPM setpoint of the PID algorithm.

$$M=K * e+K/T e\ dt-K * R * dpv/dt+ms$$

M=Controller output
K=Proportional gain—entered by engineer
e=error (setpoint—process value)
T=reset time—entered by engineer
dt=differential time
R rate gain—entered by engineer
dpv=differential process value
dpv/dt=rate of change of the process value with respect to time
ms=constant The controller 38 sends a proportional current to a DC drive motor rotating the auger shaft so that setpoint=process value.

Tube Flow Balancing—FIT/FE 003, Dual Tube Only

Flow balancing is used when two or more settling 10 tubes 14 and clarifiers 18 are added to the CCETS unit as shown in FIG. 3. A second sludge flow control 22a is added—FIT/FE 005.

Setpoint for flow balancing is calculated by:

$$SP=(Flow\_in * \%)—Sludge\_flow$$

Where pumps that need sealing water are used, this number is added to the flow_in.
%=entered by engineer
SP=flow setpoint on monitored tube in US gpm
Flow_in=flow into CCETS unit
Sludge_flow=flow out of CCETS sludge on the same tube that the flow from the clarifiers is monitored The flow from the clarifiers 18 and 18a is measured by using a magnetic flow meter which measures the fluid velocity by means of magnetic induction and the effects of the fluid velocity on the pulsed field. Known is the diameter of the flow tube.

US GPM=Fluid velocity * CSA * 7.4805
Fluid velocity=velocity in ft/min.
CSA=cross-sectional area of the flow tube=pi*r^2
pi=3.14156 ect.
r=radius of flow tube in feet
7.4805=factor to convert ft^3 to US gallons Depending on the magnetic flow meter's manufacturer, the accuracy can be 0.5% of range down to 0.3% of the flow curve. For calculating flows the meter will be in the linear portion of the flow meter's performance curve.

The current signal is 4–20 ma (milli-amps) driven by 24 vdc supply.
max current signal=20 ma
elevated zero=4 ma
range=16 ma
The controller is using a 12 bit A/D converter.
max digital=4095
elevated zero=819
digital range=3276

The controller 38 uses the calculated setpoint and process value in the Pid algorithm.

$$M = K * e + K/T e\, dt - K * R * dpv/dt + ms$$

M=Controller output
K=Proportional gain—entered by engineer
e=error (setpoint—process value)
T=reset time—entered by engineer
dt=differential time
K=rate gain—entered by engineer
dpv=differential process value
dpv/dt=rate of change of the process value with respect to time
ms=constant The controller 38 sends a proportional current signal to the control valve to position the valve so that setpoint=process value.

Sludge Blanket Level—LE 002

By monitoring the sludge blanket in the sludge storage vessel 19, an indication of how well the sludge is dewatering is provided. It also predicts when the supernatant return via line 23 to the decoupling vessel 25 will start carrying light flocs over into the decoupling vessel 25. When these conditions exist, the sludge is removed from the vessel 19 by valve 21 (see FIG. 2) and processed.

Decoupling Level Control—LE 003

The level in the decoupling vessel 25 is controlled by a capacitance level sensor which detects changes in capacitance between a probe and ground. As the level changes along the length of the probe, the di-electric constant changes proportionally. This change is then converted to a 4–20 ma signal and transmitted to the controller 38.

The current signal is 4–20 ma (milli-amps) driven by 24 vdc supply.

max current signal=20 ma
elevated zero=4 ma
range=16 ma

The controller 38 uses a 12 bit A/D converter.

max digital=4095
elevated zero=819
digital range=3276

The controller 38 uses the calculated setpoint and process value in the Pid algorithm.

$$M = K * e + K/T e\, dt - K * R * dpv/dt + ms$$

M=Controller output
K=Proportional gain—entered by engineer
e=error (setpoint—process value)
T=reset time—entered by engineer
dt=differential time
R=rate gain—entered by engineer
dpv=differential process value
dpv/dt=rate of change of the process value with respect to time
ms=constant The controller 38 sends a proportional current signal to the control valve to position the valve so that setpoint=process value.

CCETS Scaling for Various Installation Capacities

The original CCETS prototype had a 16" settling tube 14. Up and down scaling of the system has been done to design CCETS systems in a variety of sizes. The CCETS has been designed for settling tubes of 4", 8", 16" and 24" diameters. Also, in addition to a variety of settling tube sizes, an open-CCETS concept has been developed for municipal wastewater treatment. This new open-CCETS system has the ability to be expanded to a virtually unlimited capacity.

The principles used to scale the CCETS vary for each of the components of the CCETS system. The guidelines used for the scaling processes of the components are as follows:

1. Mixing tubes—The scaling of the mixing tubes 6 are based on the range of flow rates and the amount of energy appropriate to the specific wastewater system being handled.

2. Settling tubes—The scaling of the settling tubes 14 is based on the settling tube criteria discussed above. This is the ratio of the retention time to the settling time of the flocs.

3. Clarifier—The scaling of the clarifier 18 is based on the settling velocities of the flocs in the wastewater effluent.

4. Auger—The scaling of the auger 28 is based on the hydraulic behaviour of the auger. Fundamental auger dimensions are scaled geometrically.

Operating System Charts and Flow Charts

FIGS. 23 through 49 illustrate a number of system charts and flow charts relating to operation of the CCETS system.

Figure 23:
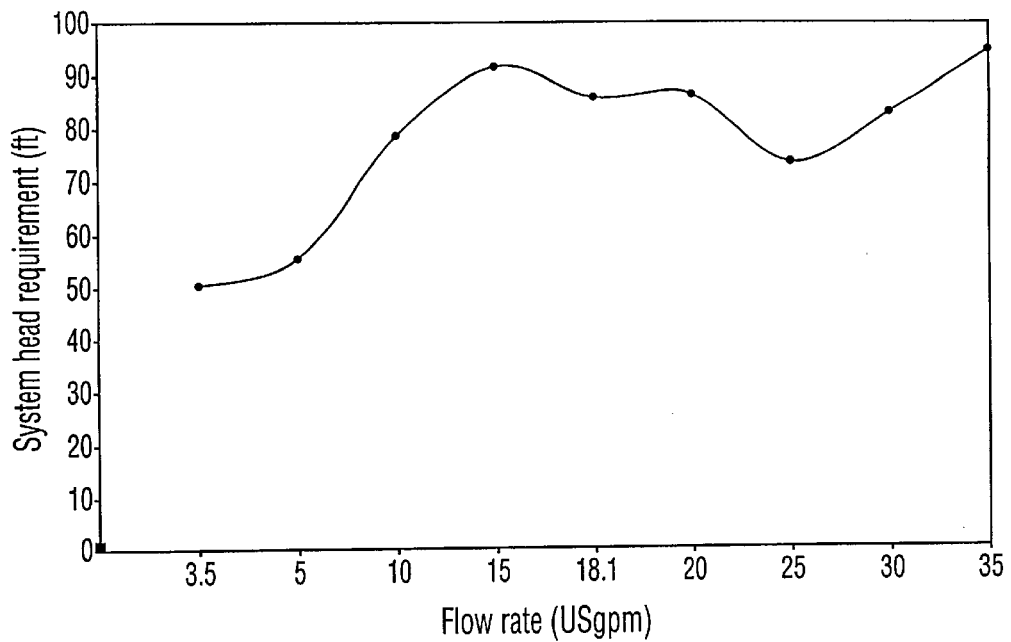
FIG. 23 illustrates a plot of a system curve on system head requirement and flow rate axes.
Figure 24:
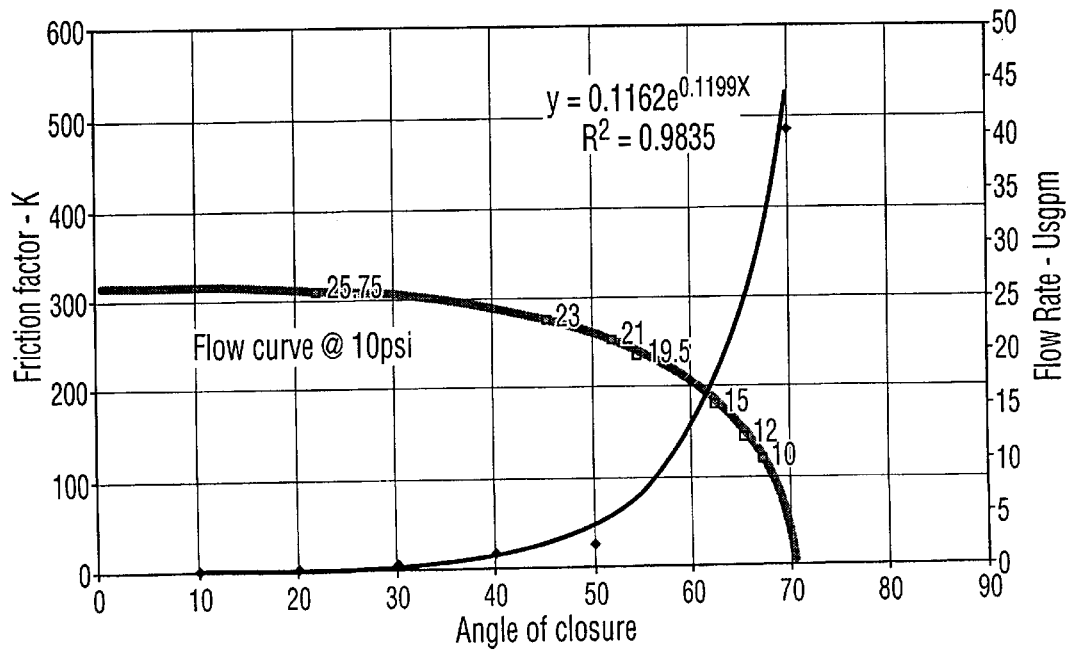
FIG. 24 illustrates a plot of a flow curve and ball valve/friction factor on friction factor and angle of closure axes.
Figure 25:
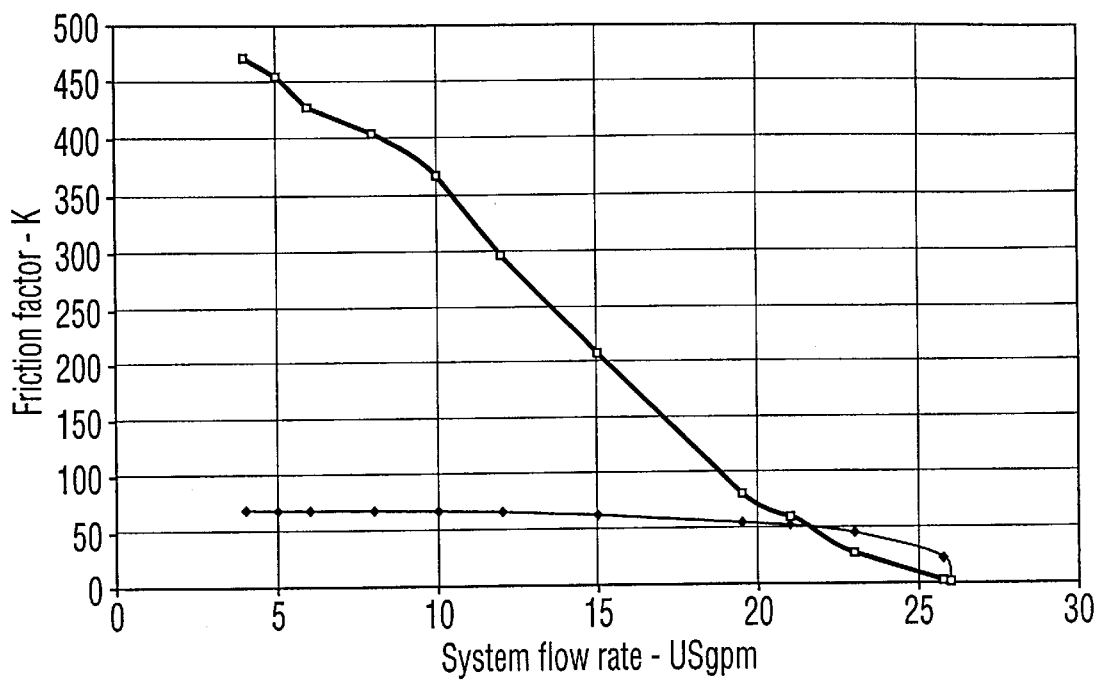
FIG. 25 illustrates a plot of a flow control valve/friction factor curve on friction factor and system flow rate axes.
Figure 26:
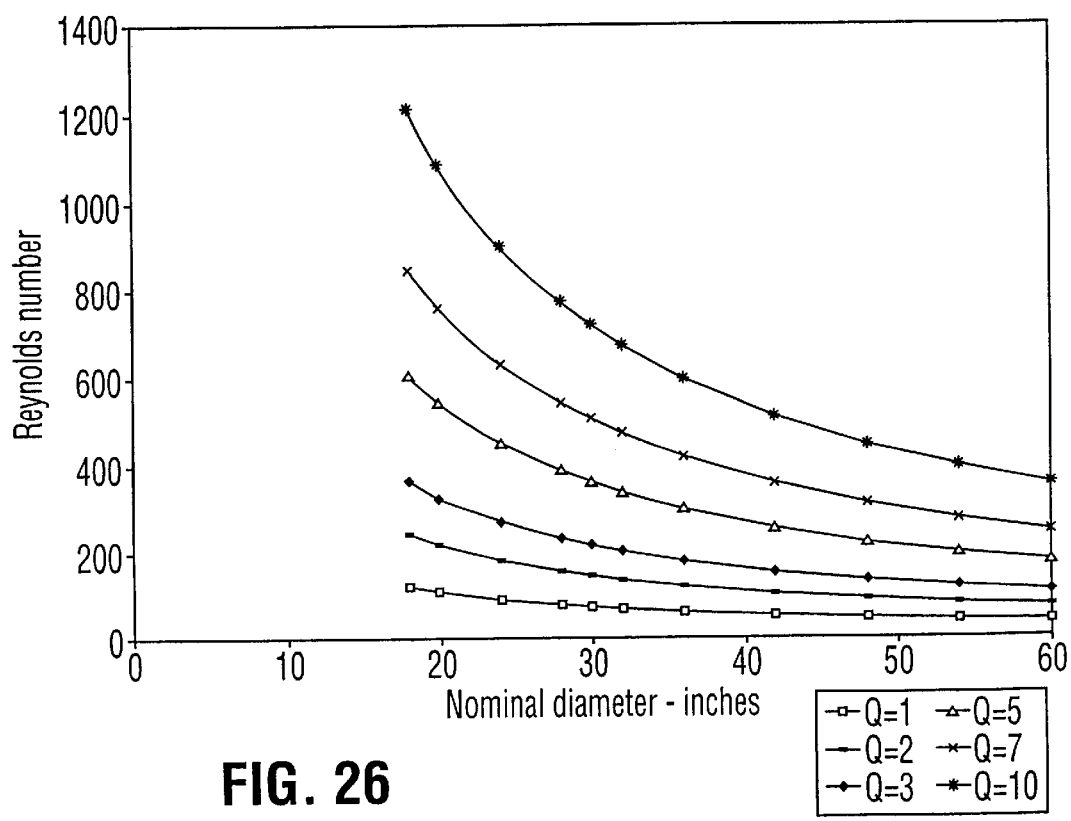
FIGS. 26 and 27 illustrate performance curves of pipe hydraulics on plots of Reynolds numbers versus nominal pipe diameter, for various process flow rates for water at a temperature of 5° C.

FIG. 23 illustrates a system curve on a plot of system head requirement versus flow rate for a 16 inch CCETS system. The system head requirement for a flow rate of 3.5 US gallons per minute is lower than for 35 US gallons per minute. FIG. 24 illustrates a flow curve and ball valve/friction factor on a plot of friction factor versus angle of closure. The flow curve at 10 psi curves downwardly from an angle of closure of 0 to 70. The friction factor curves upwardly from an angle of closure of 10 to 70. FIG. 25 illustrates a flow control valve/friction factor curve on a plot of friction factor versus system flow rate.

Figure 27:
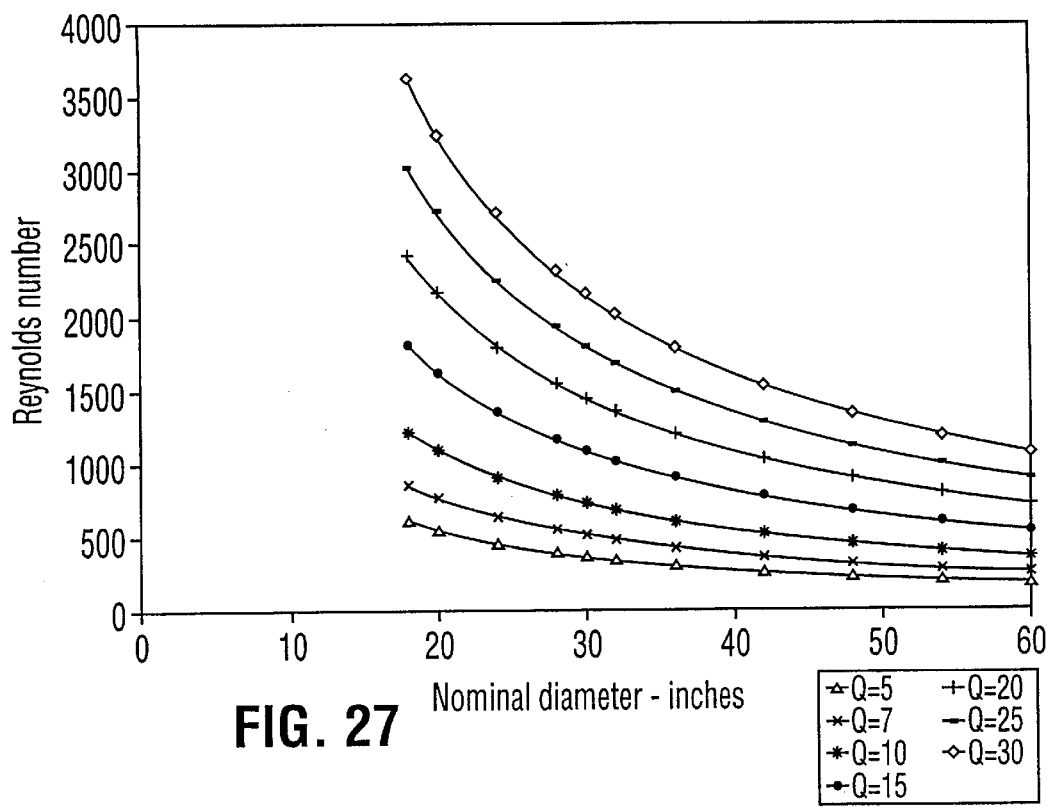
Figure 28:
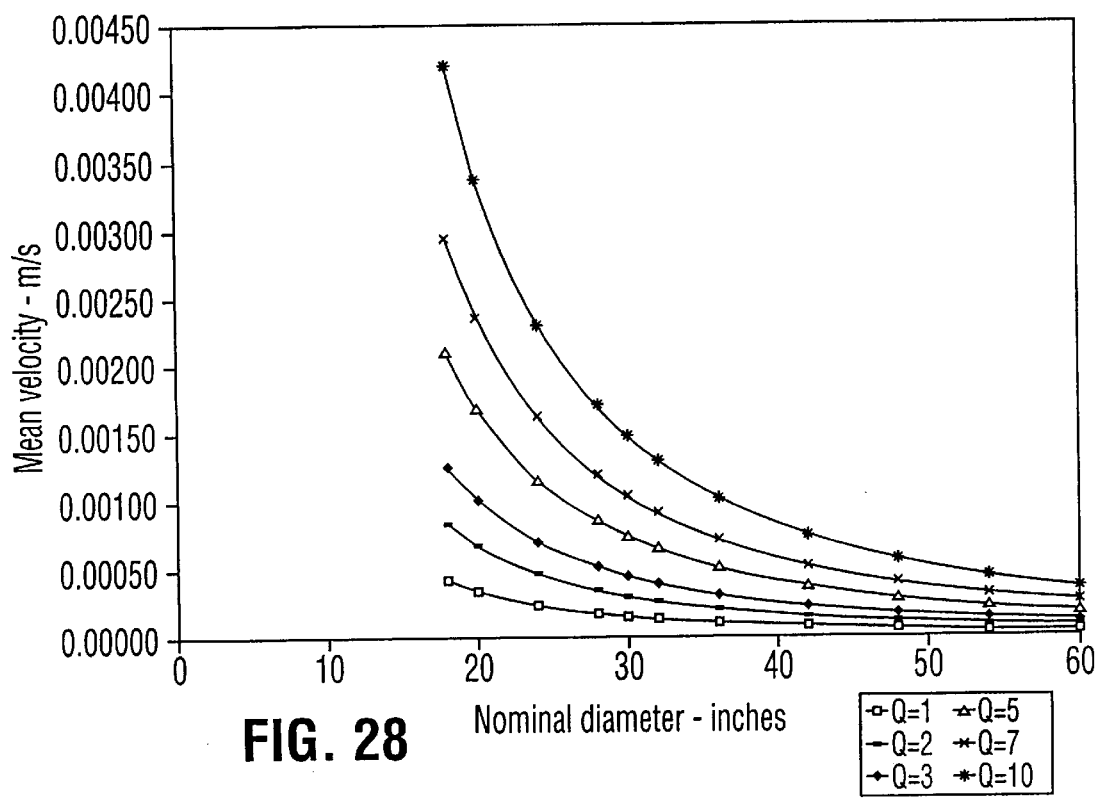
FIGS. 28 and 29 illustrate performance curves of pipe hydraulics on plots of mean velocity versus nominal pipe diameter for various process flow rates for water at a temperature of 5° C.

FIGS. 27 and 28 illustrate performance curves of pipe hydraulics on a plot of Reynolds numbers versus nominal pipe diameter, for various process flow rates for water at a temperature of 5° C. The Reynold numbers (indicating turbulence) are higher at diameters of 20 inches compared to 60 inches.

Figure 29:
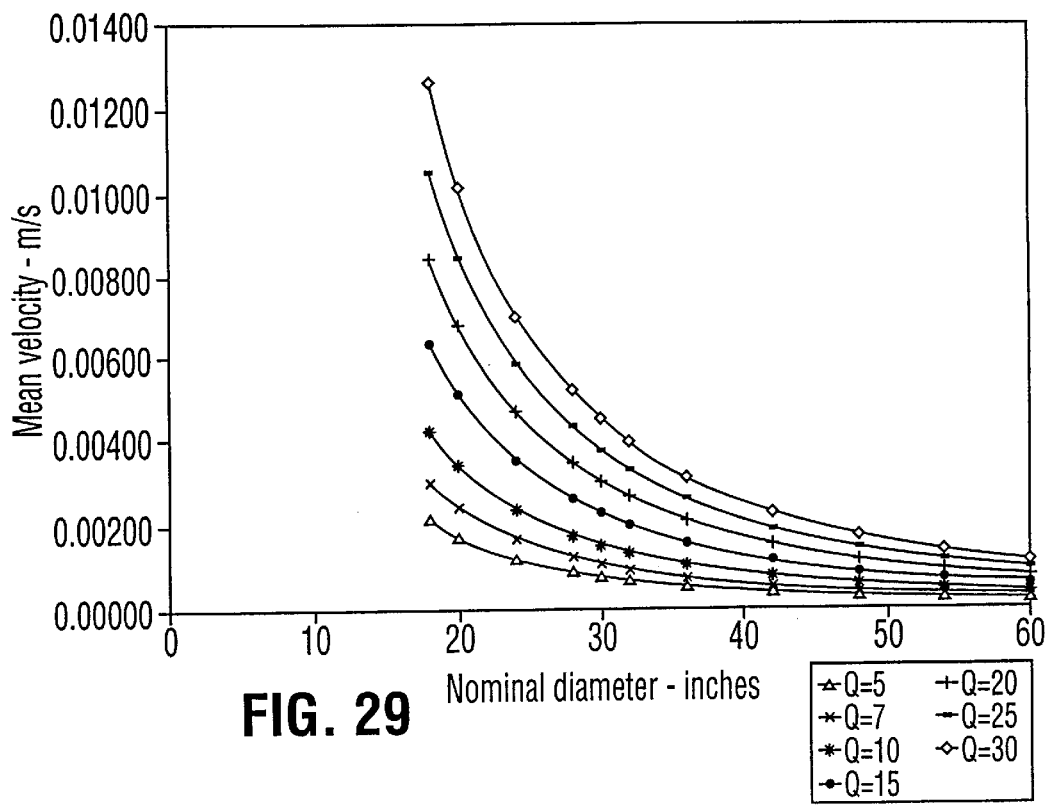
Figure 30:
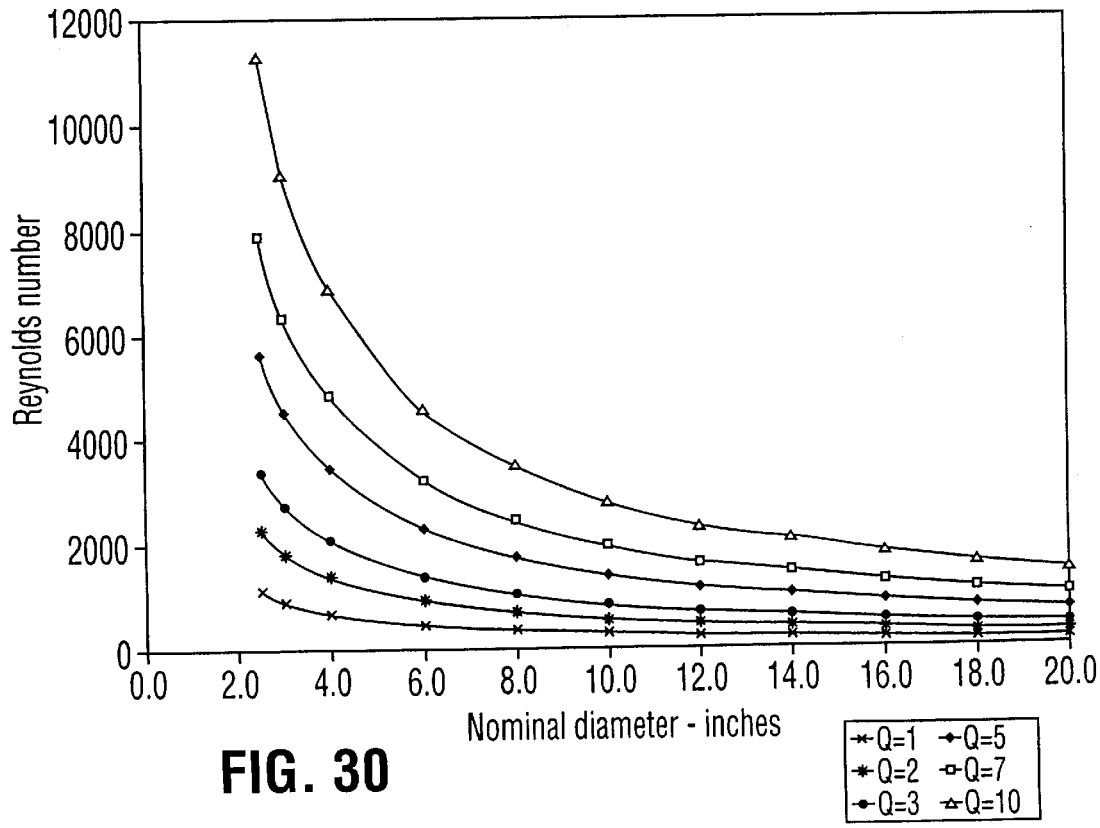
FIGS. 30 and 31 illustrate performance curves of pipe hydraulics on plots of Reynolds numbers versus nominal pipe diameter, for various process flow rates for water at a temperature of 15° C.

FIGS. 29 and 30 illustrate pipe hydraulics curves on plots of mean velocity versus nominal pipe diameter for various process flow rates for water at a temperature of 5° C. Velocities are higher at diameters of 20 inches compared to 60 inches.

Figure 31:
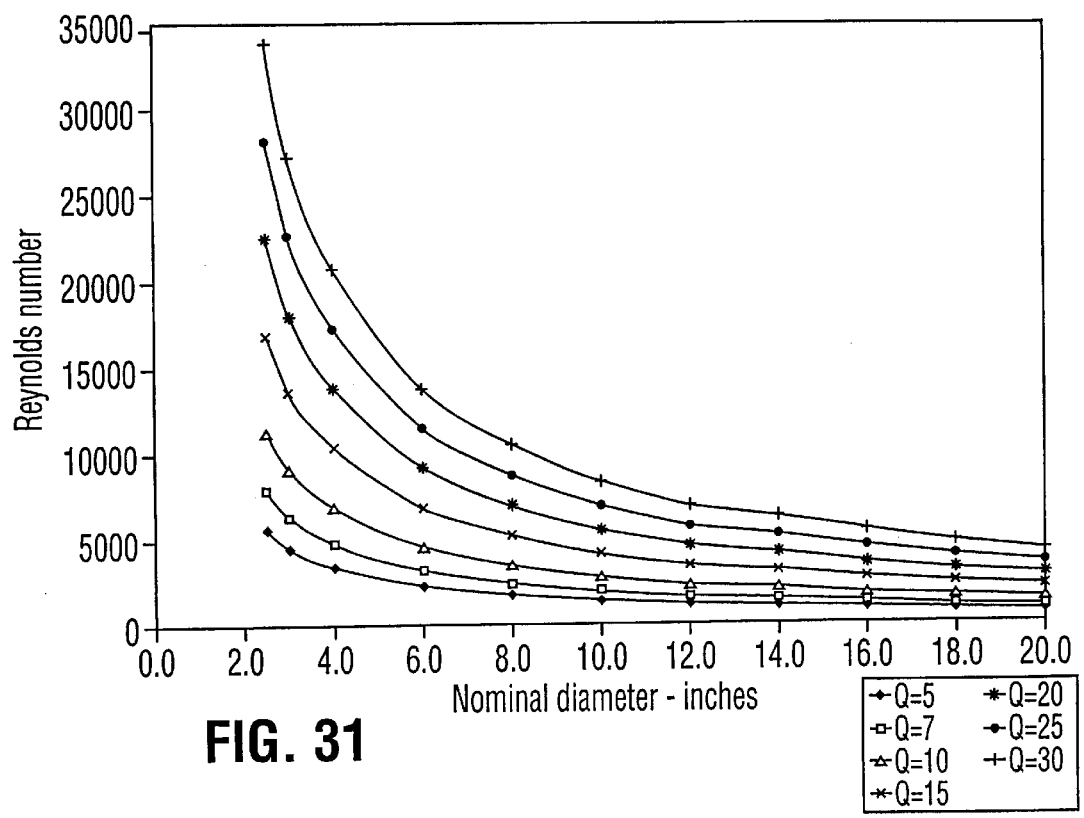

FIGS. 30 and 31 illustrate performance curves of pipe hydraulics on a plot of Reynolds numbers versus nominal pipe diameter of 0 to 20 inches, for various process flow rates for water at a temperature of 15° C.

Figure 32:
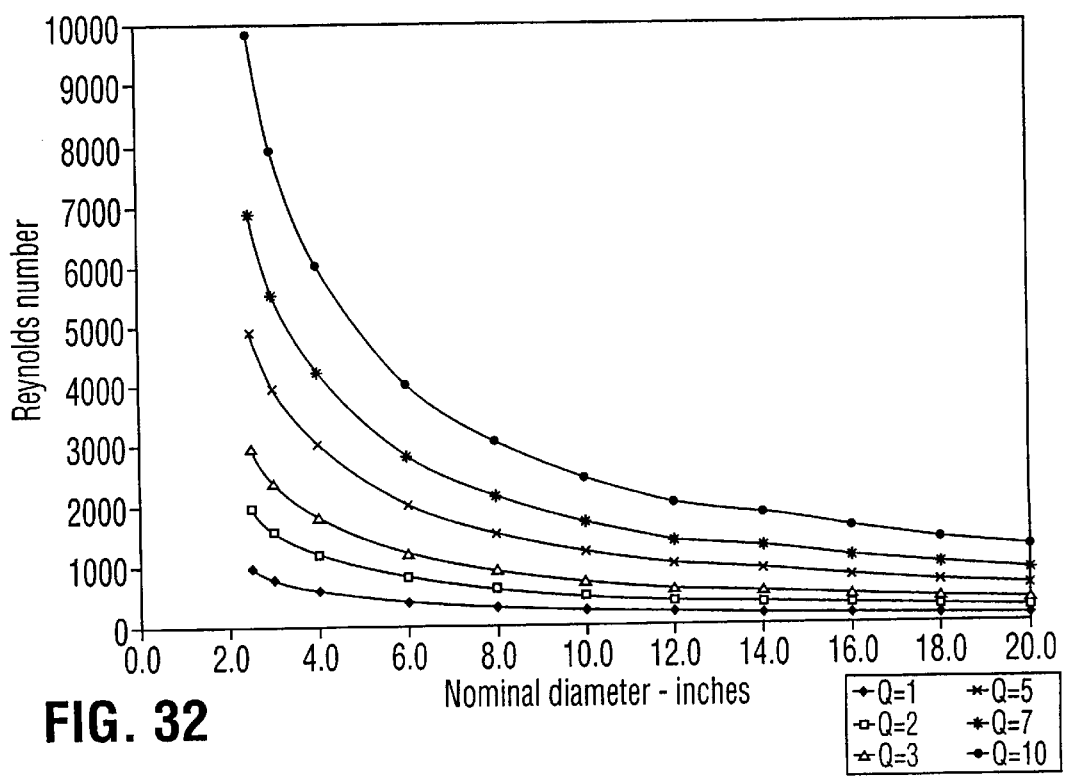
FIGS. 32 and 33 illustrate performance curves of pipe hydraulics on plots of Reynolds numbers versus nominal pipe diameter, for various process flow rates for water at a temperature of 10° C.
Figure 33:
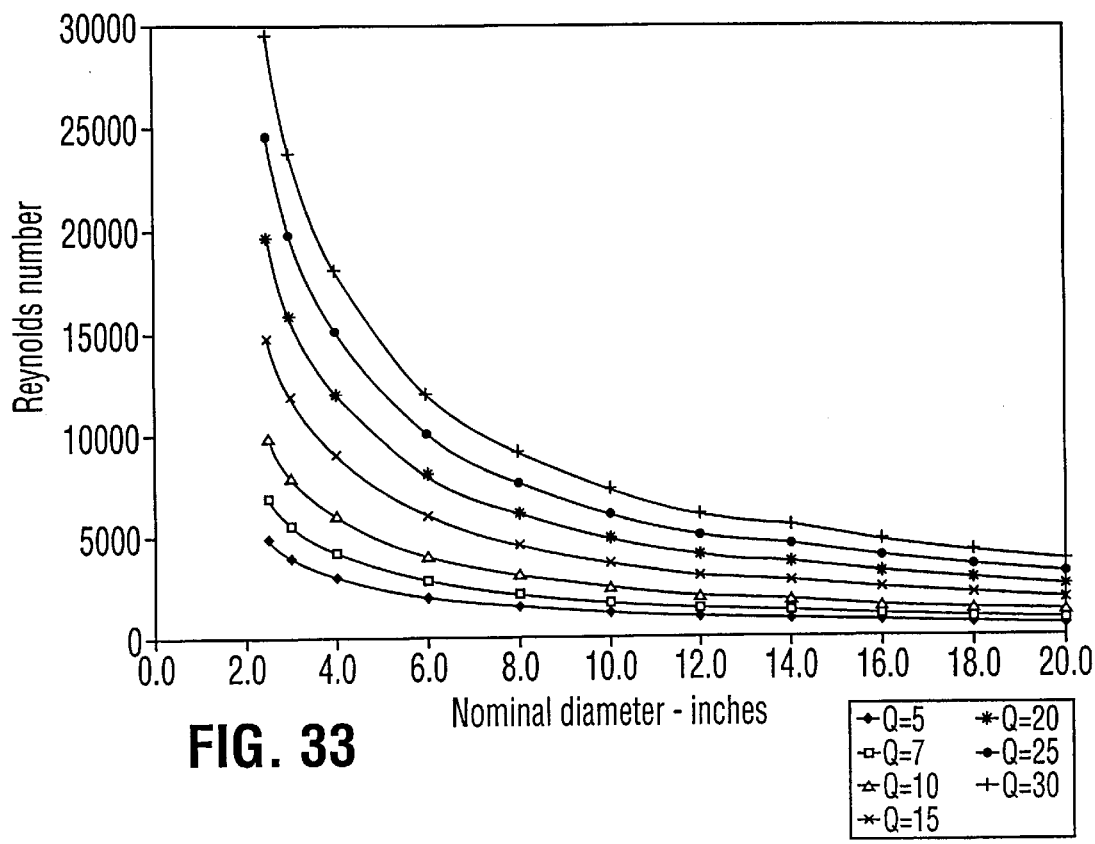

FIGS. 32 and 33 illustrate performance curves of pipe hydraulics on a plot of Reynolds numbers versus nominal pipe diameter, for various process flow rates for water at a temperature of 10° C.

Figure 34:
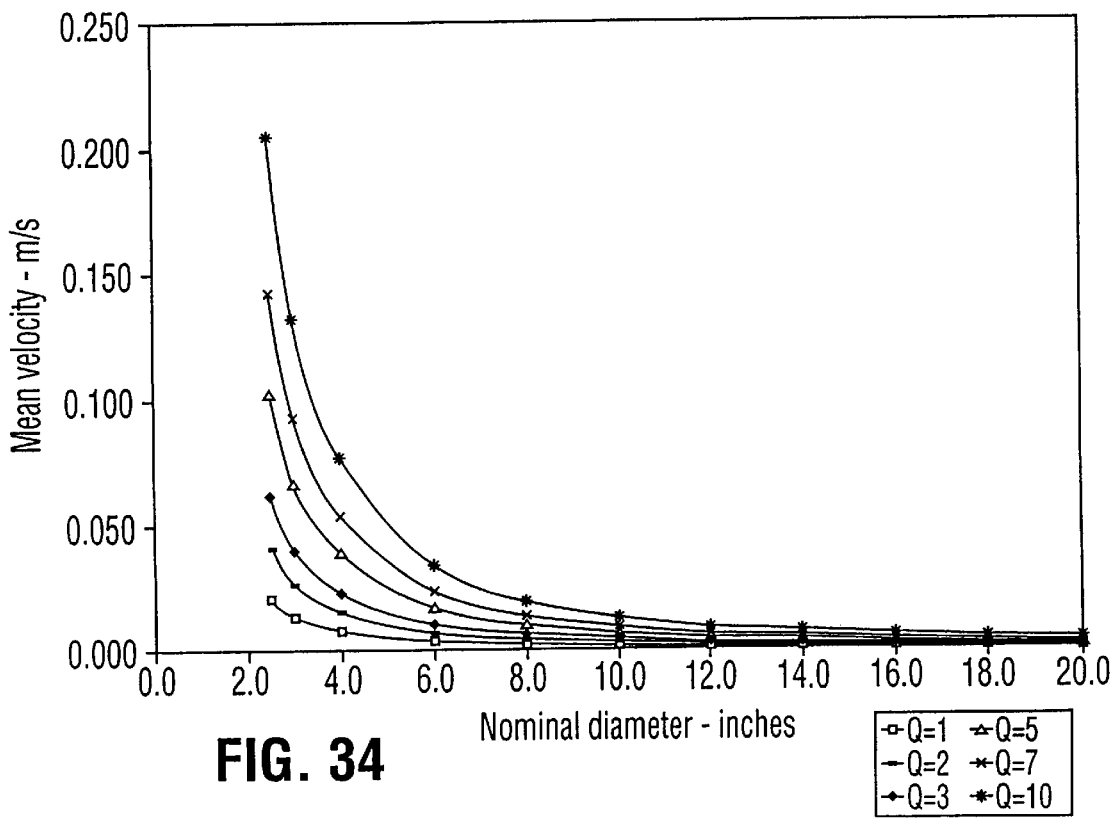
FIG. 34 illustrates pipe hydraulics curves on a plot of mean velocity versus nominal pipe diameter for various process flow rates of water at 5° C.
Figure 35:
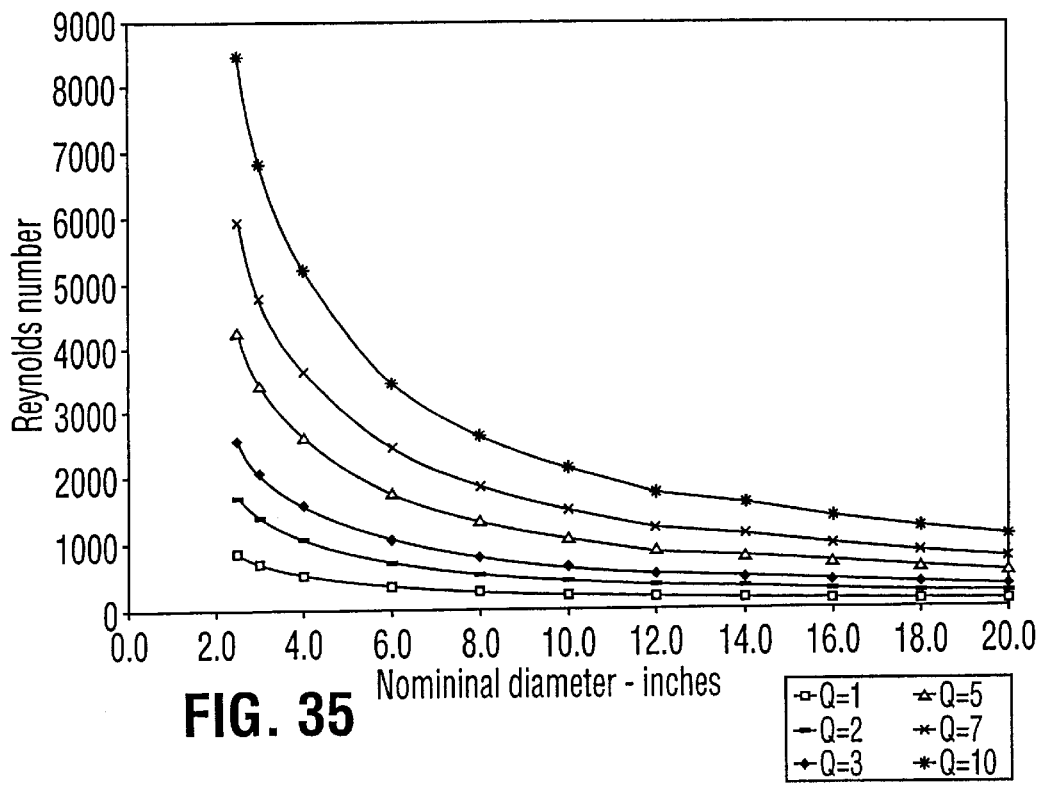
FIG. 35 illustrates pipe hydraulic curves on plots of Reynolds versus nominal pipe diameter for various process flow rates of water at 5° C.

FIG. 34 illustrates pipe hydraulics curves on a plot of mean velocity versus nominal pipe diameter for various flow rates with water at 5° C. Velocities are higher for smaller pipe diameters. FIG. 35 illustrates a series of pipe hydraulic curves for Reynolds versus nominal pipe diameter for various flow rates utilizing water at 5° C. Reynolds numbers are higher at smaller pipe diameters.

Figure 36:
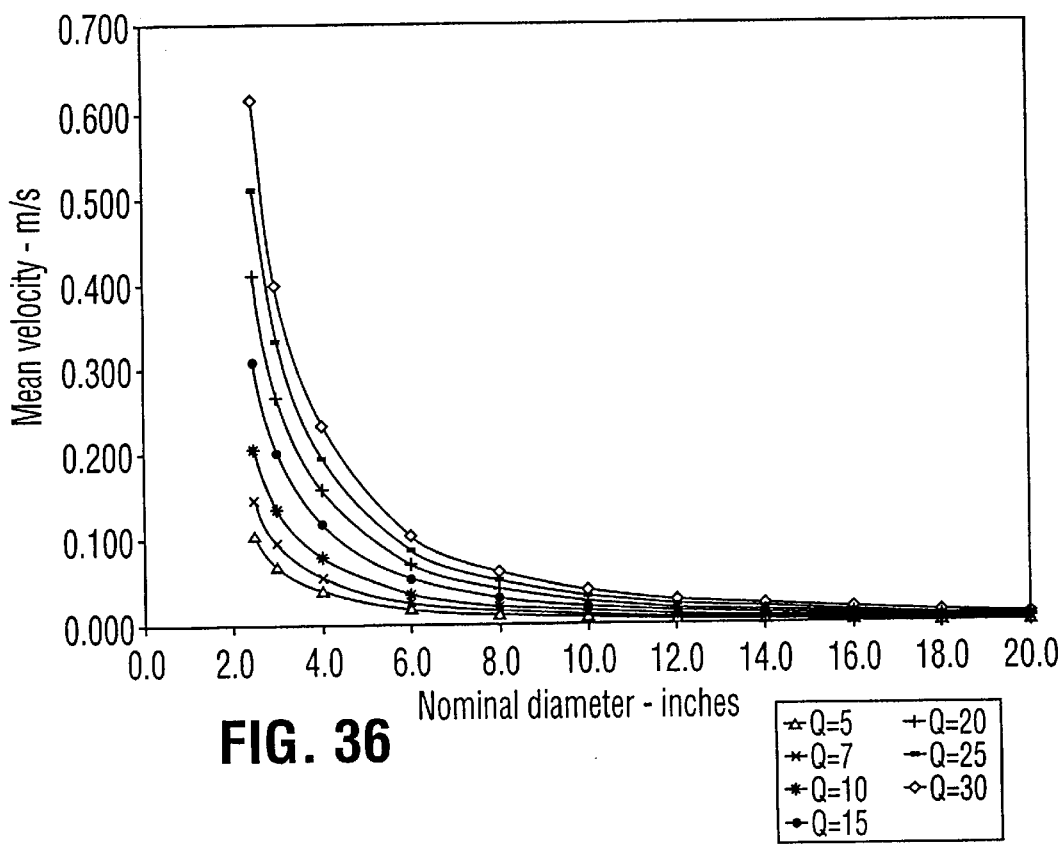
FIG. 36 illustrates pipe hydraulics curves on plots of mean velocity versus nominal pipe diameter at higher flow rates of water at 5° C.
Figure 37:
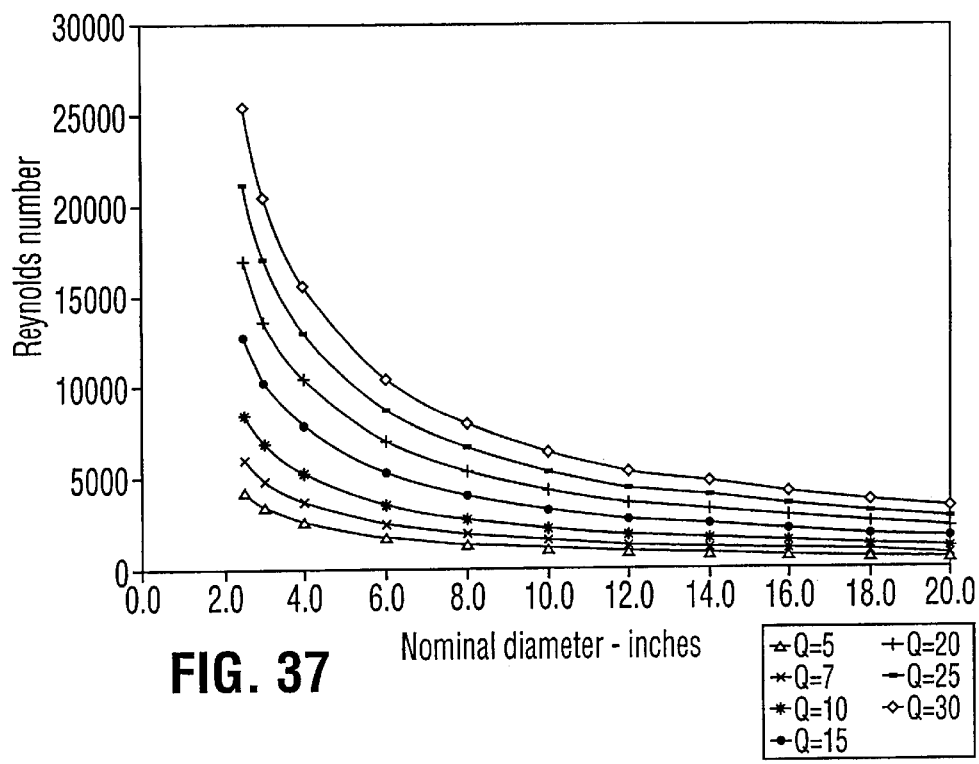
FIG. 37 illustrates pipe hydraulics curves on plots of Reynolds numbers versus nominal pipe diameter for higher flow rates of water at 5° C.

FIG. 36 illustrates pipe hydraulics flow curves for mean velocity versus nominal pipe diameter at higher flow rates utilizing water at 5° C. FIG. 37 illustrates pipe hydraulics curves of Reynolds numbers versus nominal pipe diameter for higher flow rates of water at 5° C.

Figure 38:
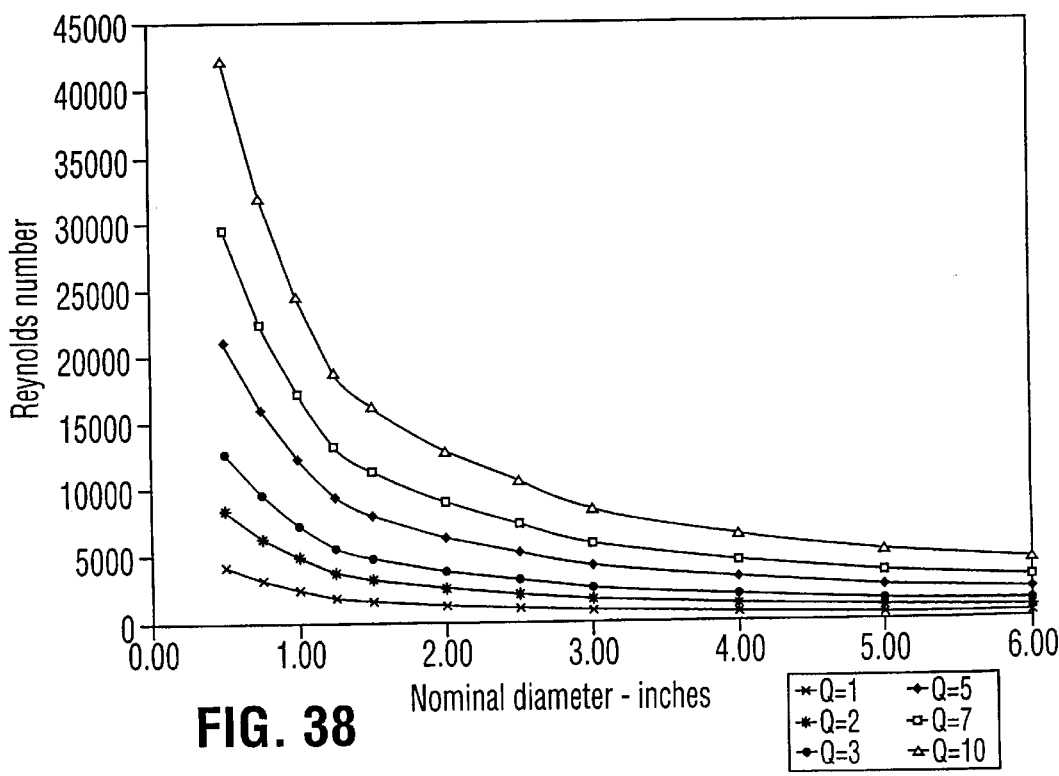
FIG. 38 illustrate pipe hydraulics curves on plots of Reynolds numbers versus nominal pipe diameter for various flow rates of water at 15° C.
Figure 39:
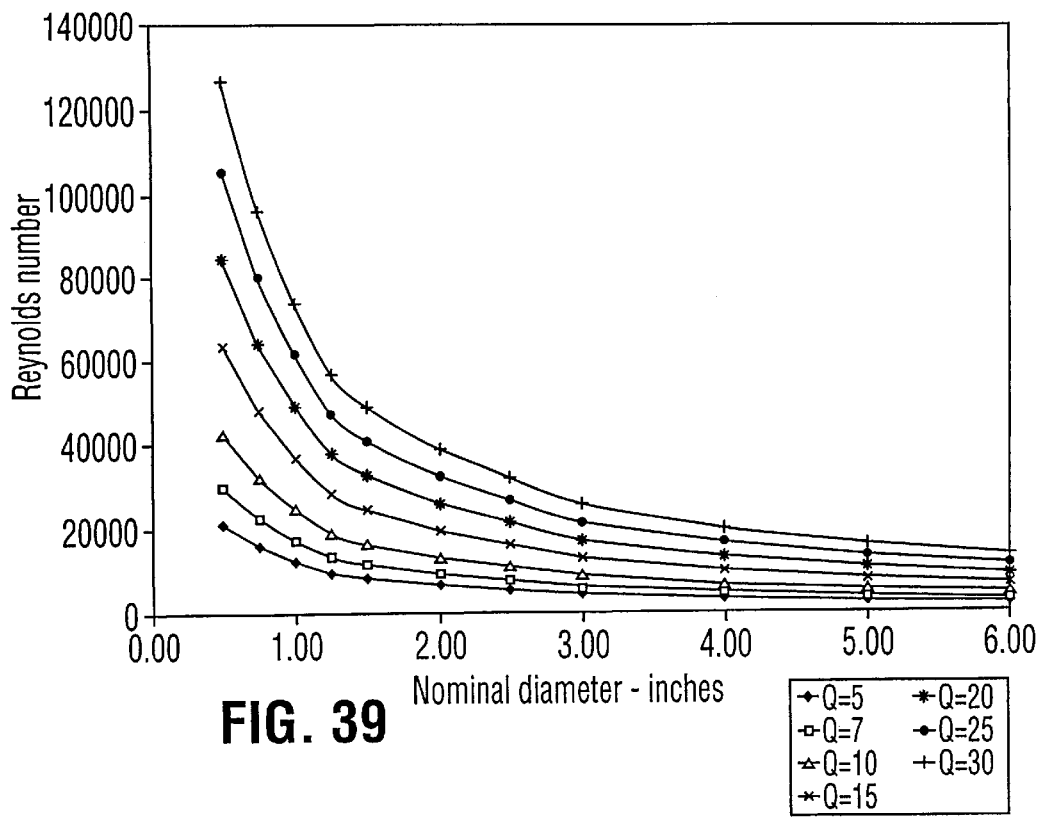
FIG. 39 illustrate pipe hydraulics curves on plots of Reynolds numbers versus nominal pipe diameter for higher flow rates of water at 15° C.

FIG. 38 illustrate a plot of pipe hydraulics curves for Reynolds numbers versus nominal pipe diameter for various flow rates with water at 15° C. FIG. 39 illustrate a plot of pipe hydraulics curves for Reynolds numbers versus nominal pipe diameter for higher flow rates with water at 15° C.

Figure 40:
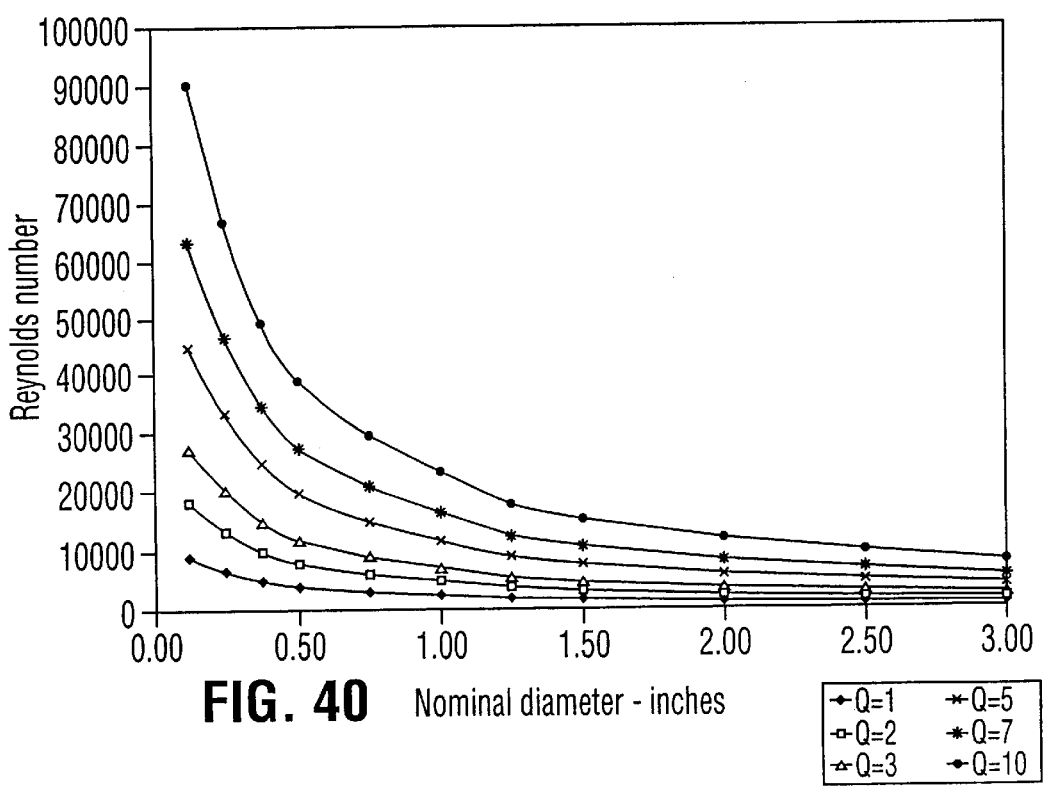
FIG. 40 illustrate pipe hydraulics curves on plots of Reynolds numbers versus nominal pipe diameter for various flow rates of water at 10° C.
Figure 41:
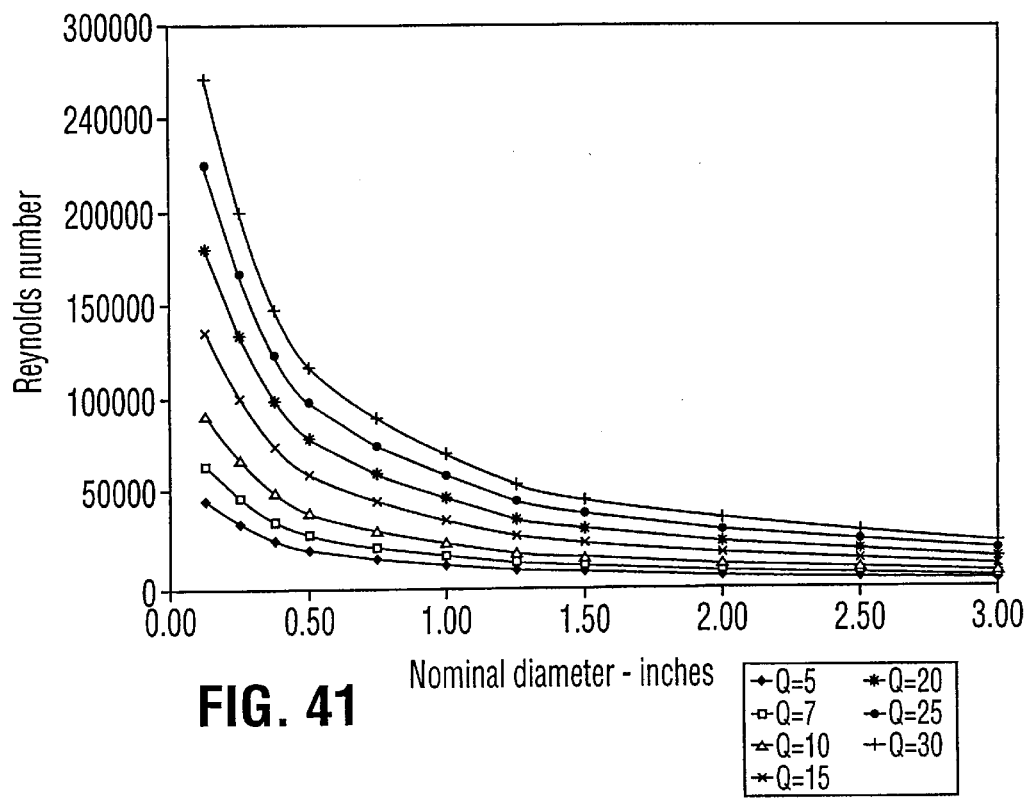
FIG. 41 illustrate pipe hydraulics curves on plots of Reynolds numbers versus nominal pipe diameter for higher flow rates of water at 10° C.

FIG. 40 illustrate a plot of pipe hydraulics curves for Reynolds numbers versus nominal pipe diameter for various flow rates with water at 10° C. FIG. 41 illustrate a plot of pipe hydraulics curves for Reynolds numbers versus nominal pipe diameter for higher flow rates with water at 10° C.

Figure 42:
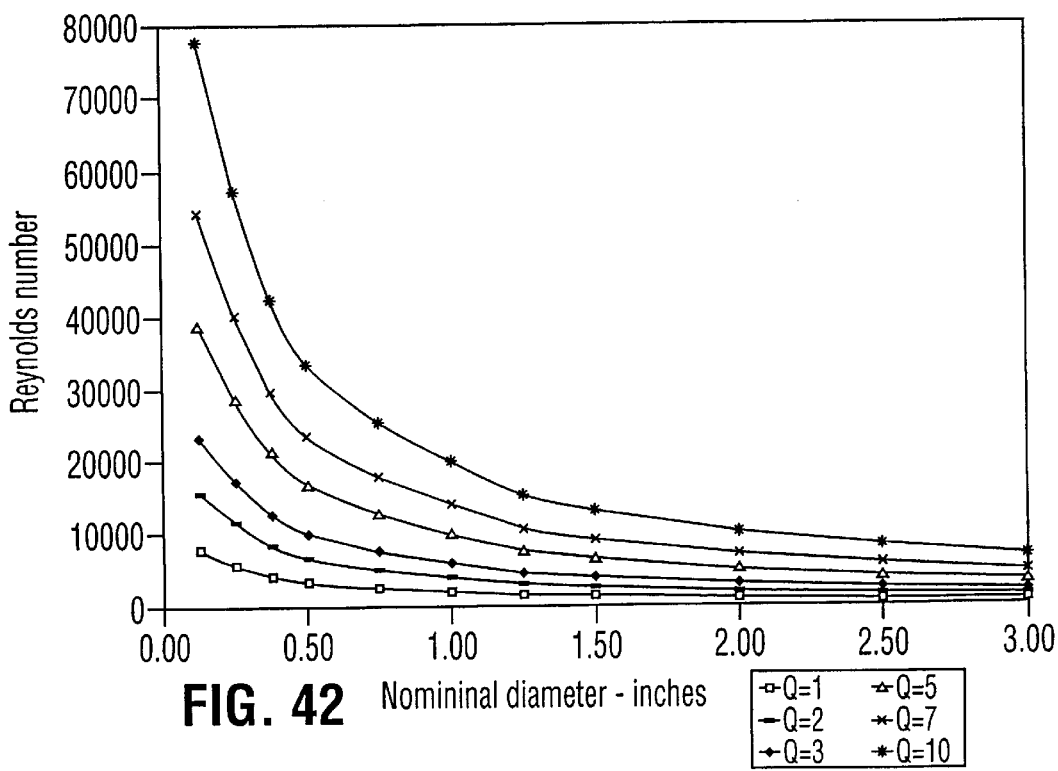
FIG. 42 illustrates pipe hydraulics curves on plots of Reynolds numbers versus nominal pipe diameter for various flow rates of water at 5° C.
Figure 43:
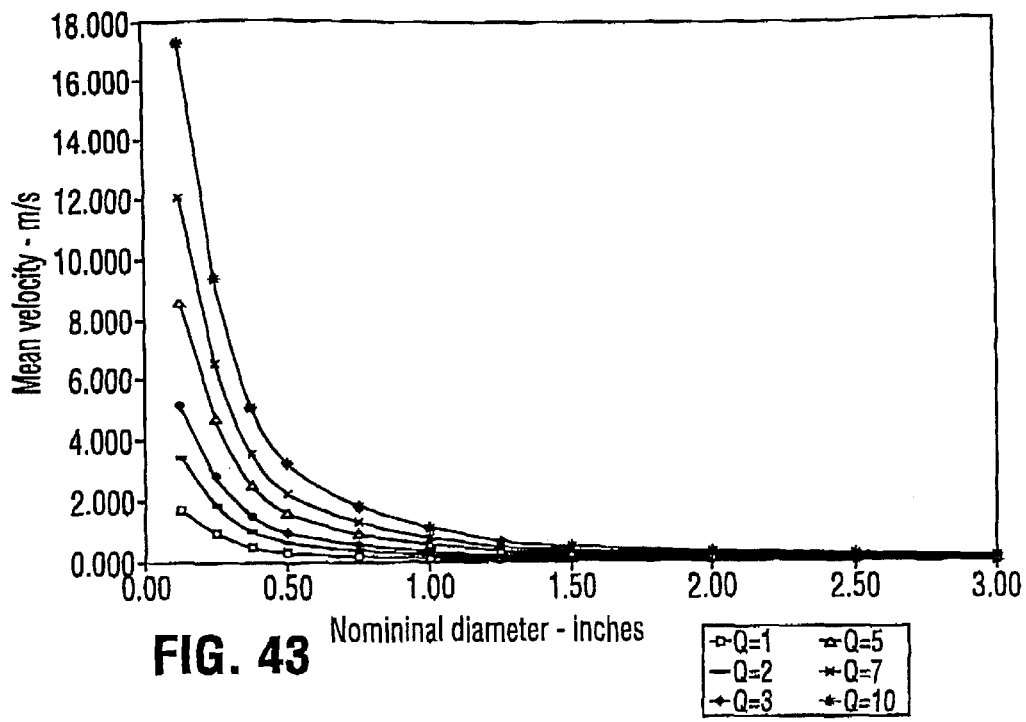
FIG. 43 illustrates pipe hydraulics curves on plots of mean velocity versus nominal pipe diameter for various flow rates of water at 5° C.

FIG. 42 illustrates pipe hydraulics curves for Reynolds numbers versus nominal pipe diameter for various flow rates of water at 5° C. FIG. 43 illustrates pipe hydraulics curves for mean velocity versus nominal pipe diameter for various flow rates of water at 5° C.

Figure 44:
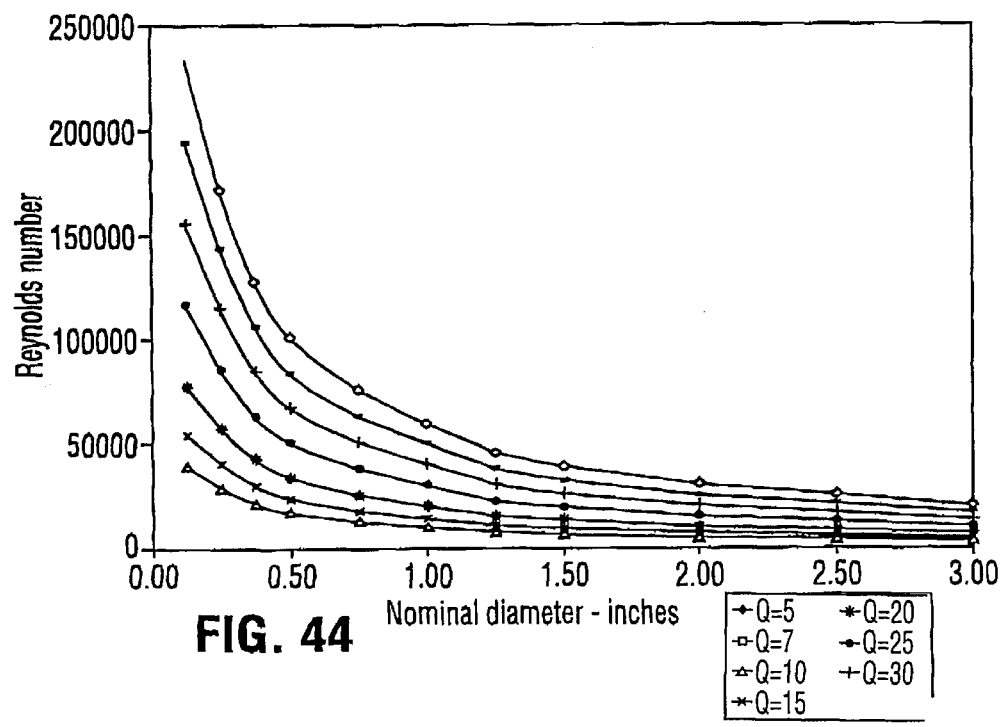
FIG. 44 illustrates pipe hydraulics curves on plots of Reynolds numbers versus nominal pipe diameter for various flow rates of water at 5° C.
Figure 45:
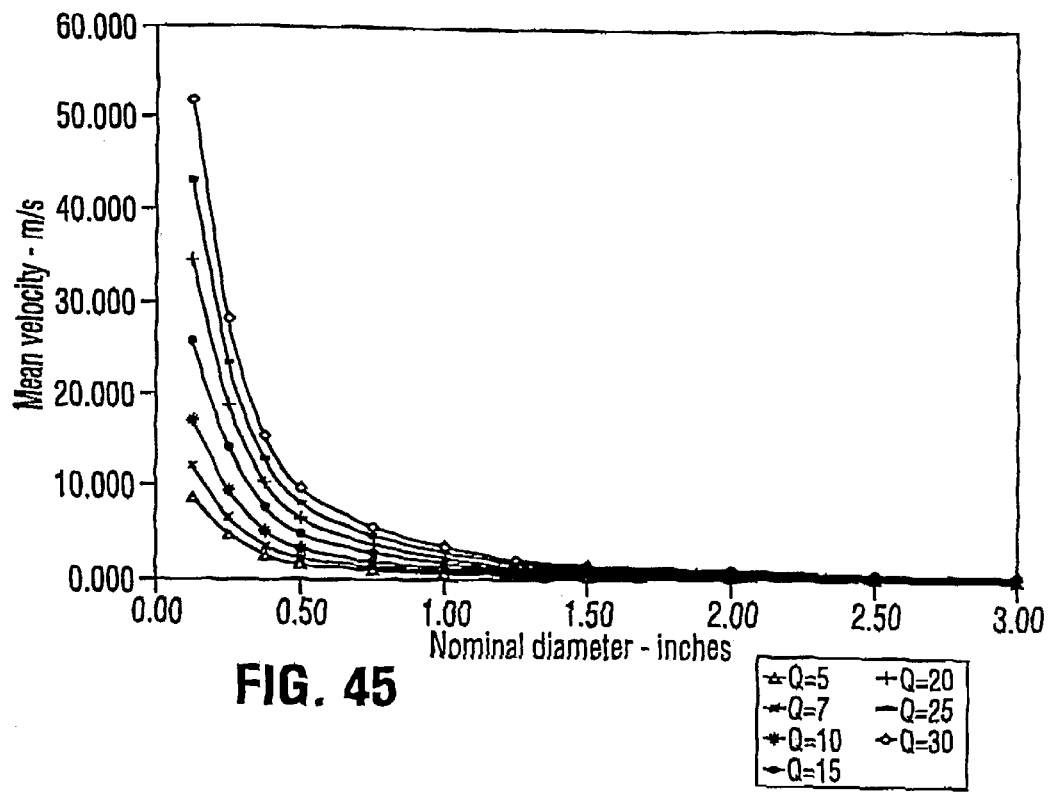
FIG. 45 illustrates pipe hydraulics curves on plots of mean velocity versus nominal pipe diameter for higher flow rates of water at 5° C.

FIG. 44 illustrates pipe hydraulics curves for Reynolds numbers versus nominal pipe diameter for various flow rates of water at 5° C. FIG. 45 illustrates pipe hydraulics curves of means velocity versus nominal pipe diameter for higher flow rates of water at 5° C.

The various curves illustrated in FIGS. 26 to 45 should enable an operator to operate the CCETS system with good mixing action in the mixing tubes and near laminar solids settling flow in the settling tube.

Figure 46:
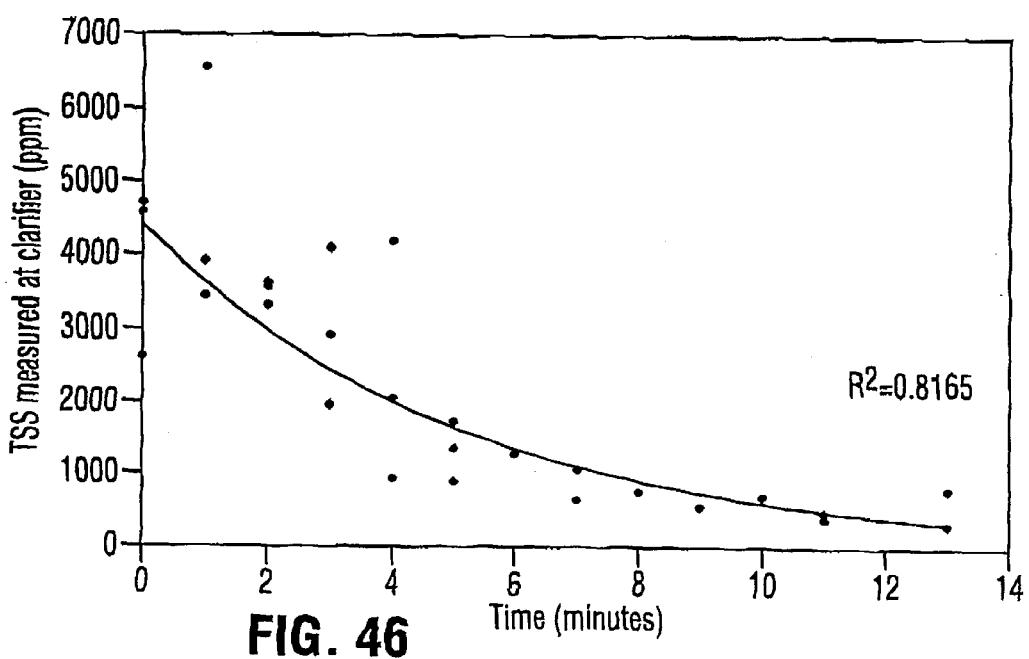
FIG. 46 illustrates a sludge evacuation curve of TSS measured at the clarifier plotted against time for the closed chemical enhancement treatment system.

FIG. 46 illustrates sludge evacuation curve of Total Suspended Solids (TSS) measured at the clarifier plotted against time for the closed chemical enhancement treatment system.

Figure 47:
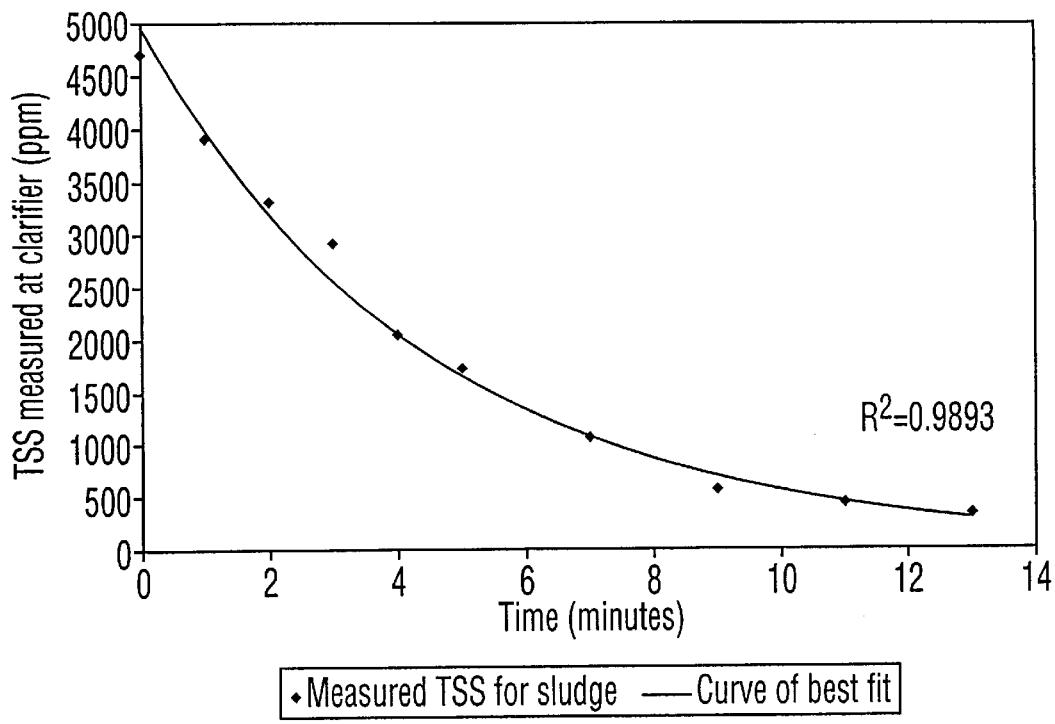
FIG. 47 illustrates sludge evacuation curve of TSS measured at the clarifier plotted against time for the closed chemical enhancement treatment system, evaluated at a date later in time than the curve in FIG. 46.

FIG. 47 illustrates sludge evacuation curve of TSS measured at the clarifier plotted against time for the closed chemical enhancement treatment system evaluated at a date later in time than the curve in FIG. 47.

Figure 48:
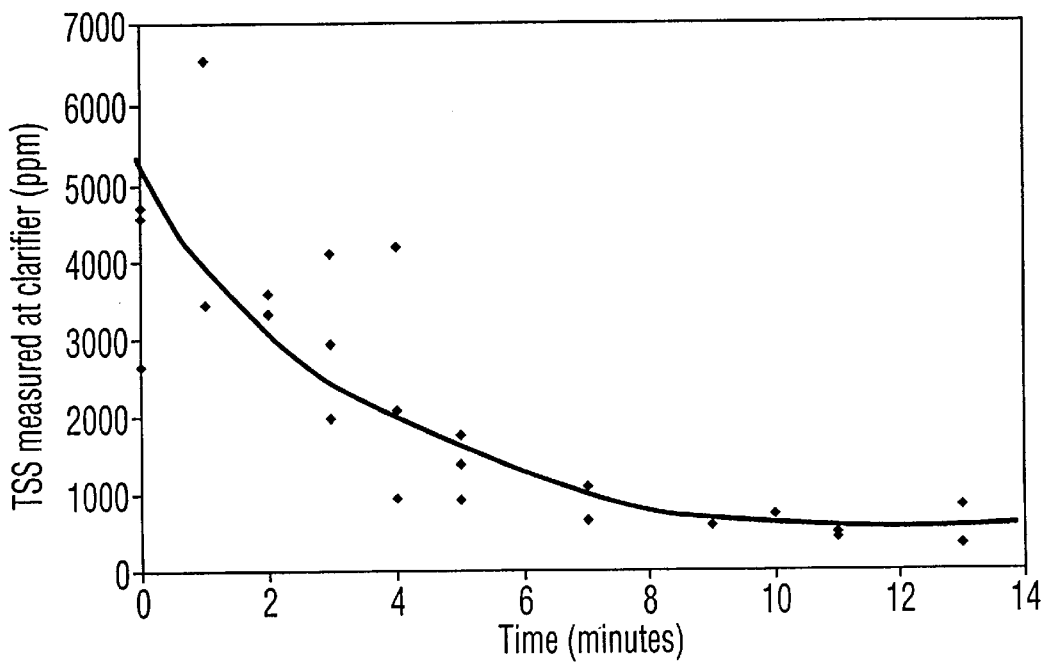
FIG. 48 illustrates sludge evacuation curve of TSS measured at the clarifier plotted against time for the closed chemical enhancement treatment system evaluated at a date later in time than the curve in FIG. 46.

FIG. 48 illustrates sludge evacuation curve of TSS measured at the clarifier plotted against time for the closed chemical enhancement treatment system evaluated at a date later in time than the curve in FIG. 46.

Figure 49:
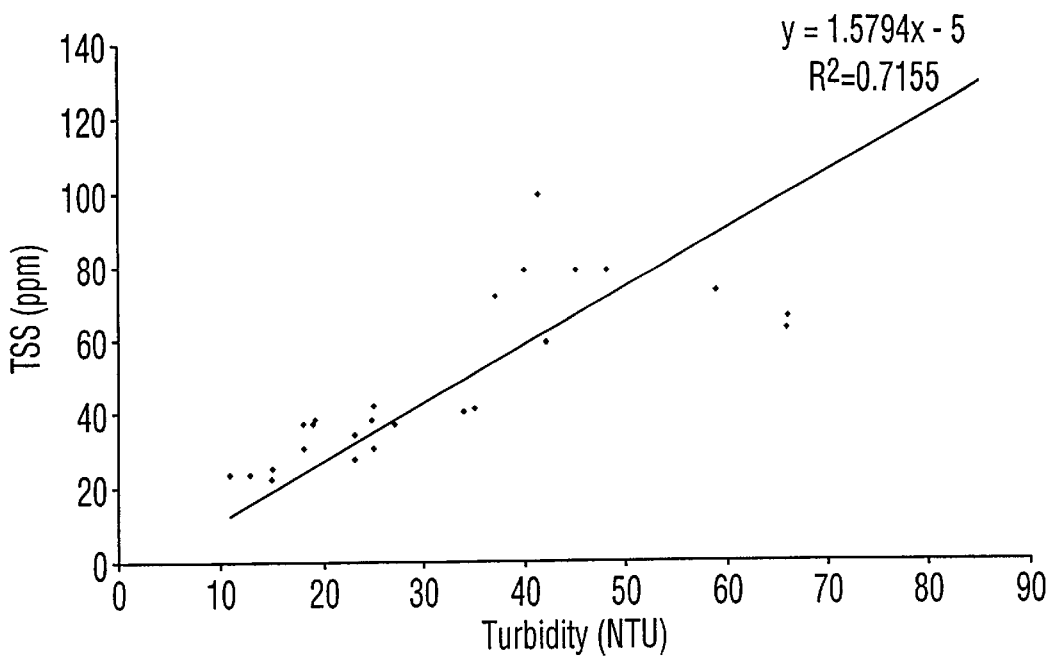
FIG. 49 illustrates a plot of the relationship between TSS and turbidity (NTU) obtained by operation of a prototype of the closed chemical enhancement treatment system.

FIG. 49 illustrates a plot of the relationship between TSS and turbidity obtained by operation of a prototype of the closed chemical enhancement treatment system.

Figure 50:
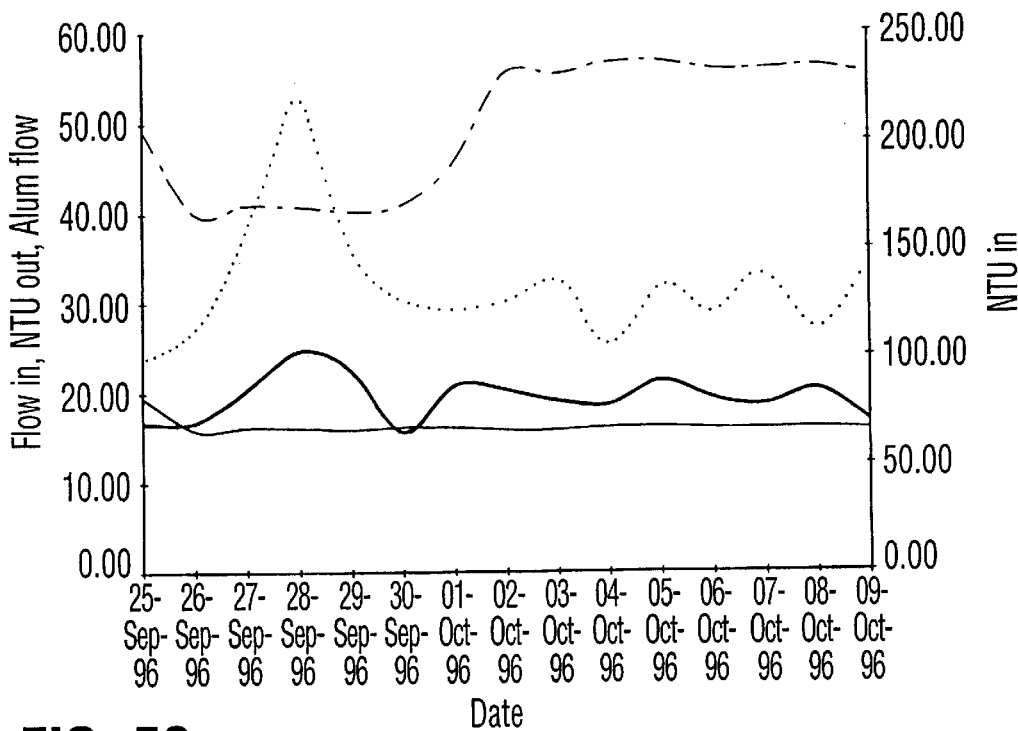
FIG. 50 illustrates a plot of alum flow, turbidity in, turbidity out and flow in U.S. gals. per minute over a fifteen day period. Turbidity out was relatively uniform even though turbidity in fluctuated relatively widely.
Figure 51A:
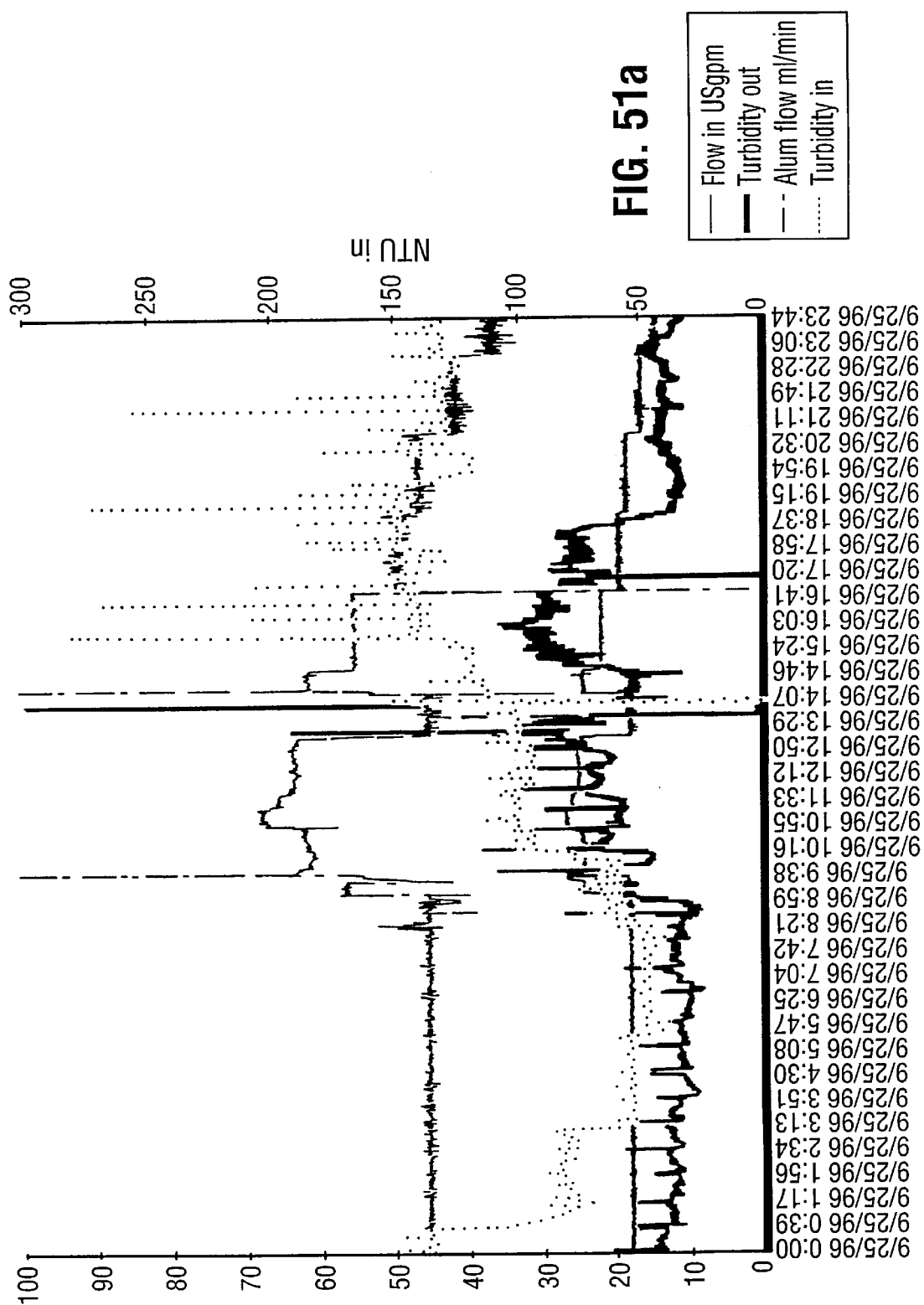
Figure 51B:
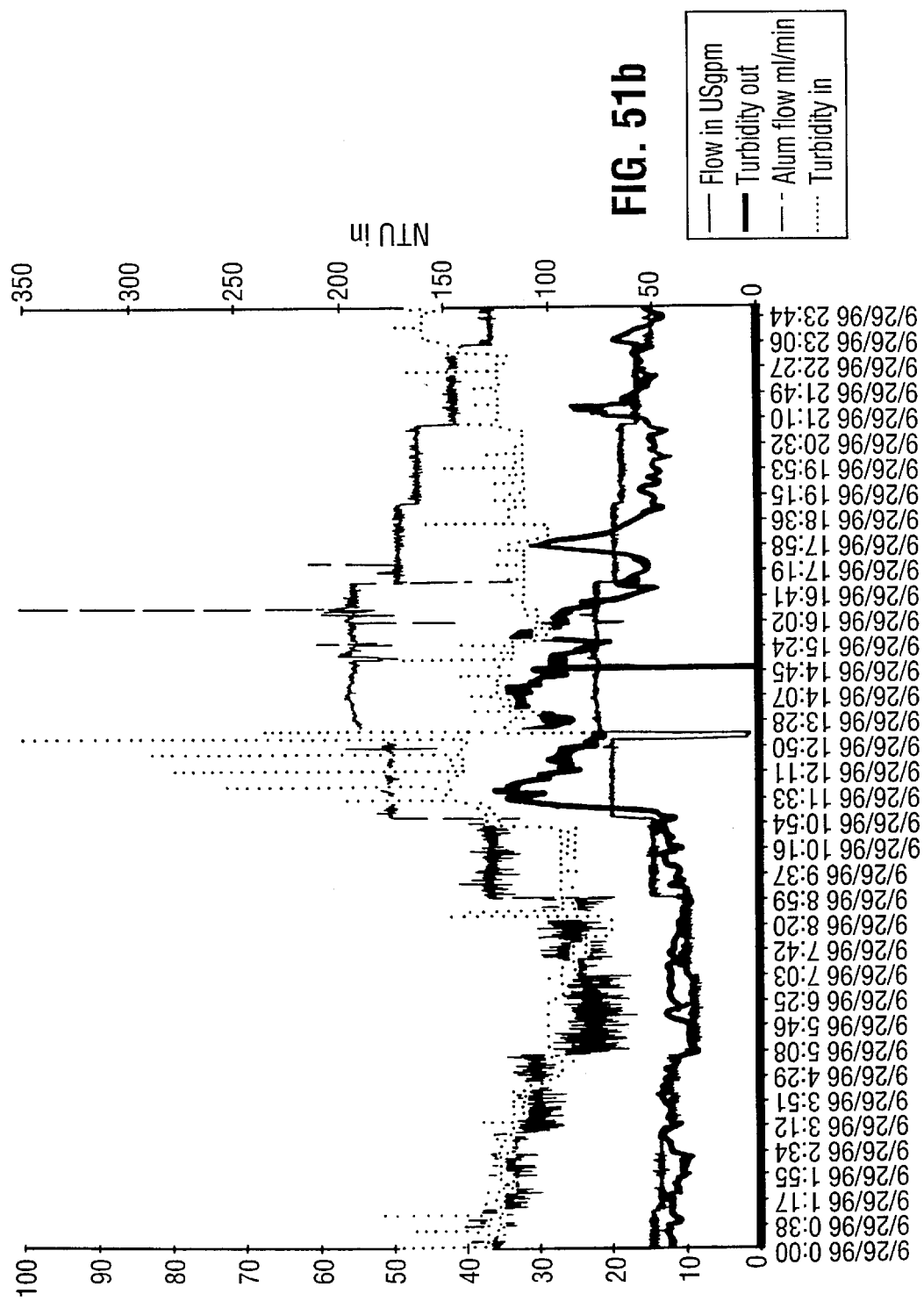
Figure 51C:
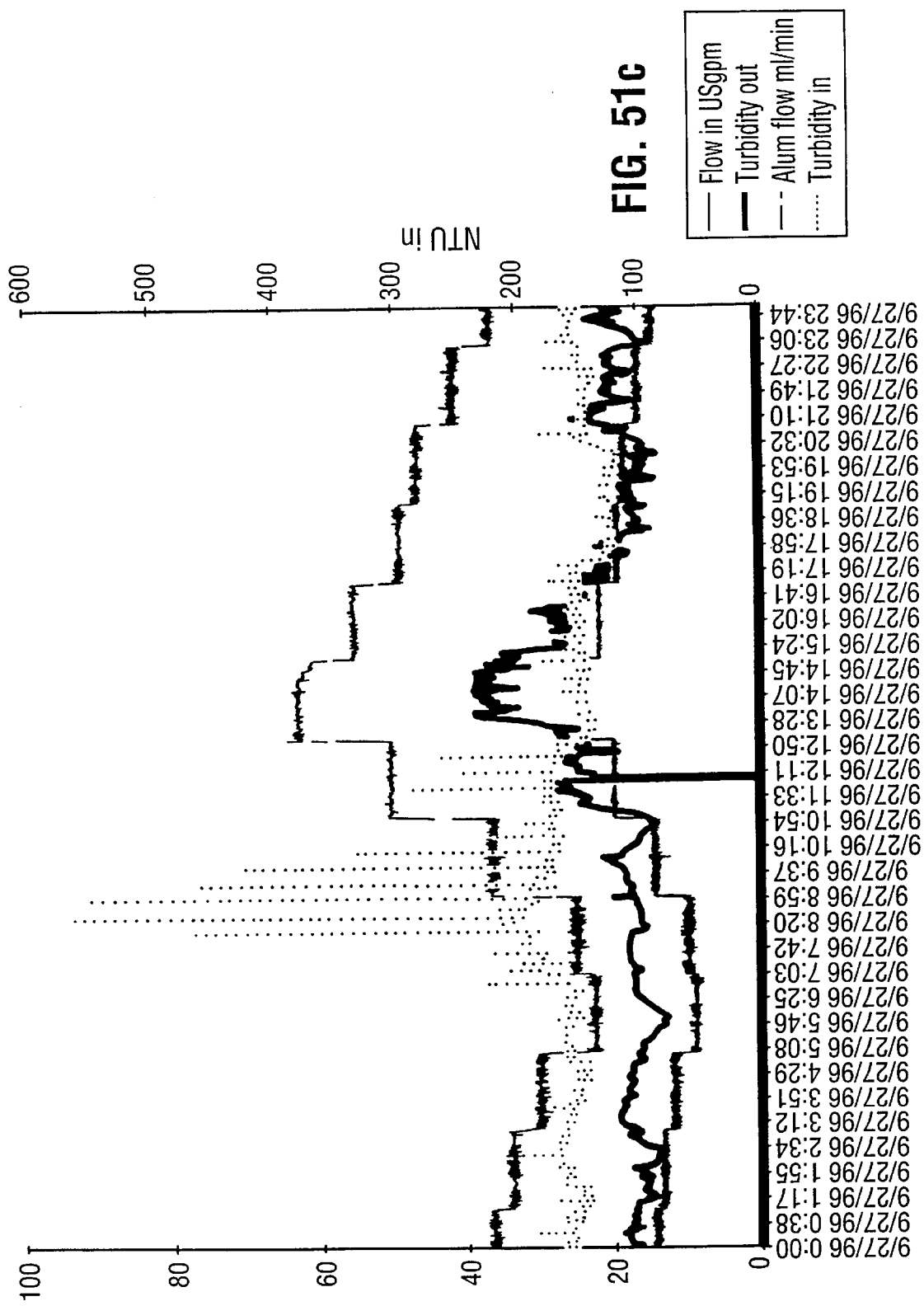
Figure 51E:
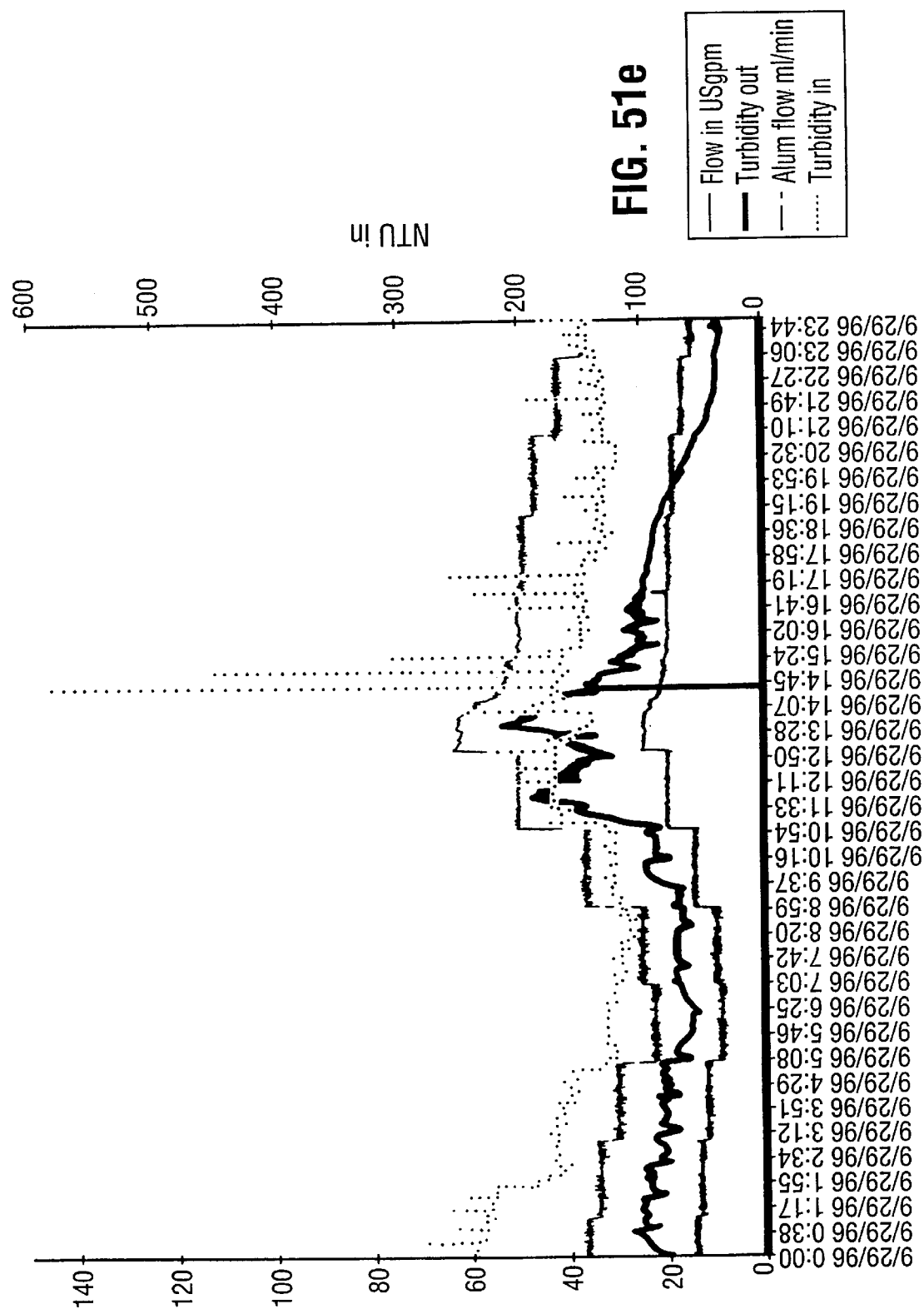
Figure 51F:
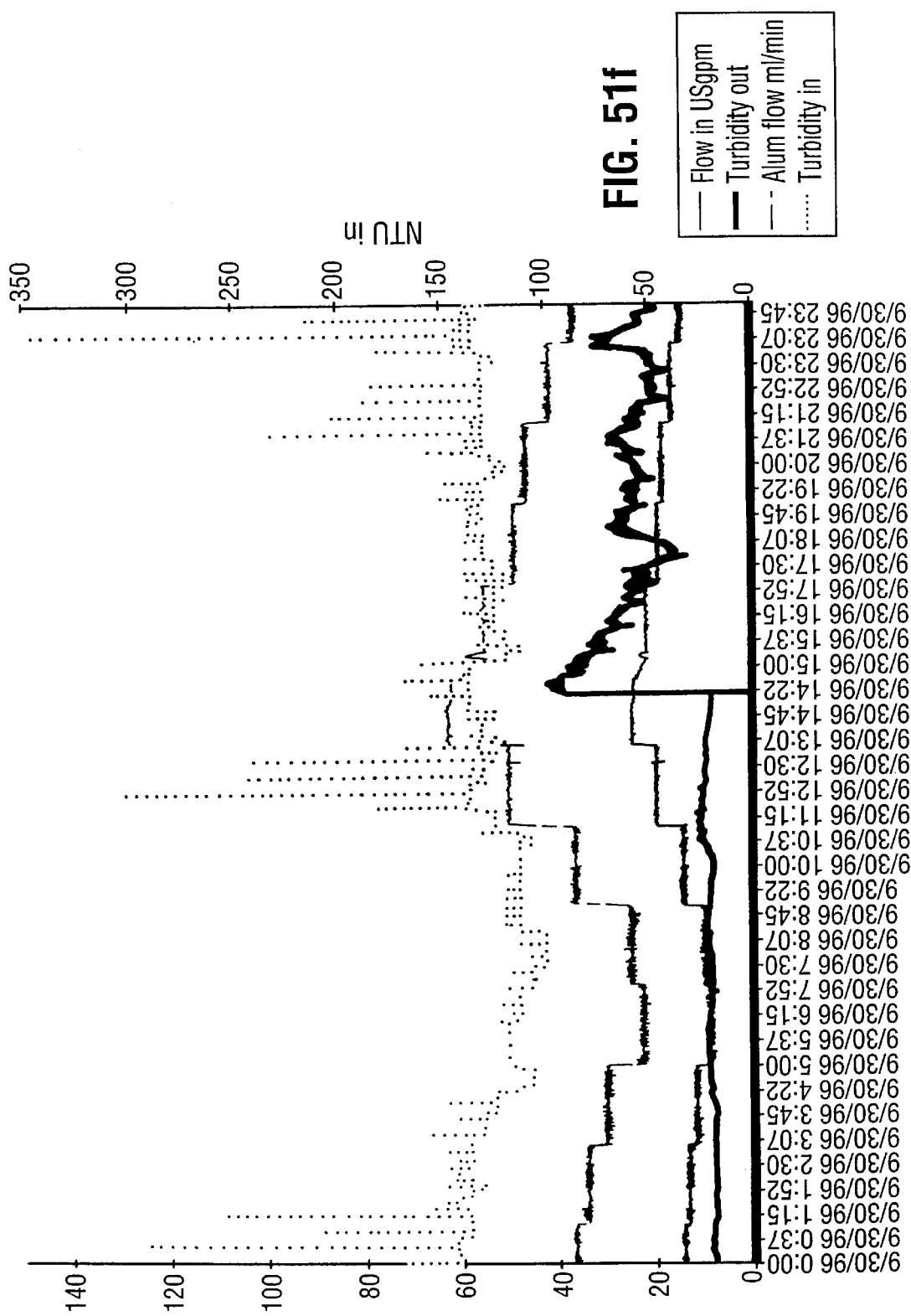
Figure 51G:
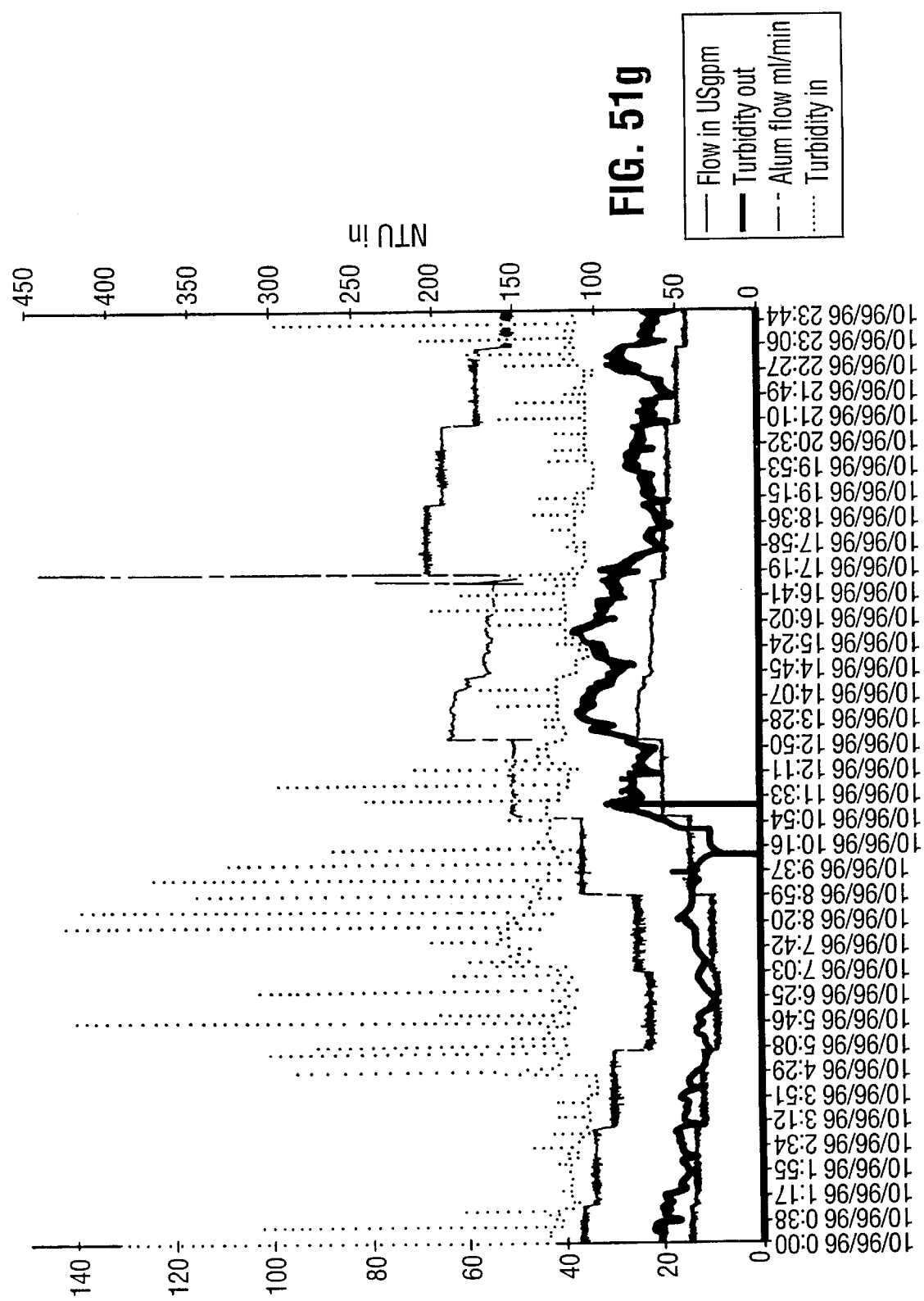

FIG. 50 illustrates a plot of alum flow, turbidity in, turbidity out and flow (U.S. gals. per min.) over a fifteen day period.

FIGS. 51a through 51g illustrate daily plots of flow in, turbidity in, turbidity out and alum flow obtained by operation of a prototype of the closed chemical enhancement treatment system over a period of seven days. It will be noted that notwithstanding wide variations in flow in, and turbidity in, turbidity out levels remained low and relatively constant.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A solids and liquids effluent chemically treatment system comprising:
    (a) a pump with an inlet and an outlet for receiving solids and liquid effluent and for grinding and pumping the ground solids and liquid effluent through a pump outlet;
    (b) an inlet for introducing flocculent and coagulants into the ground solids and liquid effluent;
    (c) a first baffle-free unobstructed mixing chamber having a slope of between about 1 percent to about 10 percent in a downstream direction between an inlet connected to the outlet of the pump and an outlet at an end opposite the inlet to produce a solids and liquids effluent flow rate;
    (d) a second baffle-free unobstructed mixing chamber having a slope between about 1 percent and about 10 percent in a downstream direction between an inlet connected to the outlet of the first mixing chamber and an outlet at an end opposite the inlet of the second mixing chamber to produce a solids and liquids effluent flow rate, the first and second mixing chambers having sufficient length to enable the flocculent and coagulants to fully mix with the solids and liquids effluent and form flocs which are capable of settling from the liquid effluent;
    (e) a horizontal settling chamber having an inlet and an outlet, the inlet being connected to the outlet of the second mixing chamber, the settling chamber being of a dimension to produce a horizontal solids and liquids effluent flow rate which is slower in the settling chamber than the solids and liquids effluent flow rate of the first and second mixing chambers, the settling chamber promoting laminar flow in the solids and liquid effluent and having sufficient length to enable the flocs in the liquid effluent to settle from the liquid effluent;
    (f) a mechanical propulsion device for moving the solids and liquid effluent through the length of the settling chamber; and
    (g) a vertical clarifier chamber connected to the outlet of the settling chamber, the clarifier chamber being of a dimension to produce a vertical solids and liquids effluent flow rate in the clarifier chamber which is slower than the solids and liquids effluent flow rate in the settling chamber and thereby enabling the flocs to separate from the liquid effluent.

2. A system as claimed in claim 1 including a sludge vessel connected to a solids outlet of the clarifier chamber for collecting solids and liquid effluent.

3. A system as claimed in claim 2 including a decoupling vessel connected with the sludge vessel, the decoupling vessel withdrawing liquid effluent from the sludge vessel.

4. A system as claimed in claim 3 wherein the sludge vessel is operated at above atmospheric pressure and the decoupling vessel is operated at atmospheric pressure.

5. A system as claimed in claim 3 wherein the decoupling vessel holds liquid effluent taken from the clarifier chamber and the sludge vessel for a period of time before the liquid effluent is transported to a liquid effluent filter.

6. A system as claimed in claim 1 wherein the propulsion device in the settling chamber is an auger.

7. A system as claimed in claim 1 wherein the first and second mixing chambers and the settling chamber are tubular, the first and second mixing chambers having the same diameter and the settling chamber having a diameter which is greater than the diameter of each of the first and second mixing chambers.

8. A system as claimed in claim 7 wherein the outlet of the settling chamber increases in diameter as it connects with the inlet of the clarifier chamber and thereby reduces the velocity of effluent therein, and encourages the solids to separate from the liquid effluent.

9. A system as claimed in claim 8 wherein the clarifier chamber is tubular and is positioned vertically, the diameter of the tubular clarifier chamber being greater than the diameter of the settling tube.

10. A system as claimed in claim 9 wherein the bottom of the clarifier chamber has a downwardly tapering hollow cone which collects and draws solids from the liquid effluent in the clarifier chamber.

11. A system as claimed in claim 10 including a valve associated with the hollow cone, the valve opening periodically to enable settled solids to be evacuated from the hollow cone.

12. A system as claimed in claim 11 including an optical sensing device which senses when the solids have been evacuated from the hollow cone of the clarifier chamber.

13. A system as claimed in claim 1 wherein the settling chamber is tubular and elongated and has positioned in the interior thereof a rotating auger, the flights of said auger having one or more openings disposed therein.

14. A system as claimed in claim 1 including a pair of settling chambers with respective inlets connected to an outlet of the second mixing chamber.

15. A system as claimed in claim 1 wherein the system is operated at a pressure of 8 to 20 psig.

16. A system as claimed in claim 15 including a flow control valve between the grinder pump and the first mixing chamber inlet, and a mixing valve between the pump and the mixing tube inlet for mixing flocculant and coagulant with the solids and liquid effluent.

17. A system as claimed in claim 1 including at least one filter which processes liquid effluent drawn from the clarifier chamber.

18. A system as claimed in claim 17 including an ultra-violet treatment unit for radiating liquid effluent obtained from the filter.

19. A system as claimed in claim 17 including an ozone treating unit which enables ozone gas to be injected into the liquid effluent to sterilize the effluent.

20. A system as claimed in claim 1 including sensors located at the first and second mixing chambers, the settling chamber and the clarifying chamber, and the sensors are monitored and controlled by software operated and controlled by a central computer.

21. A method of treating a solids containing liquid effluent in a chemical enhanced treatment system comprising:

(a) grinding the solids in the liquid effluent;

(b) adding a flocculent to the ground solids and liquid effluent and mixing the flocculent and the ground solids;

(c) pumping the solids containing liquid effluent and mixed flocculent into an inlet of a first baffle-free unobstructed mixing chamber, transporting the solids and liquid effluent from the first mixing chamber to a second baffle-free unobstructed mixing chamber which has an effluent flow rate identical to an effluent flow rate of the first mixing chamber;

(d) transporting the flocculent treated effluent from an outlet of the second mixing chamber to an inlet of a horizontal settling chamber which has a horizontal effluent flow rate slower than the flow rate of the second mixing chamber and settling the solids;

(e) transporting the solids containing liquid effluent from an outlet of the settling chamber to an inlet of a vertical clarifying chamber which, has a vertical effluent flow rate slower than the flow rate of the settling chamber, and separating the solids from the liquid effluent;

(f) transporting the separated solids from a solids outlet of the clarifier chamber to a sludge vessel and further settling the solids;

(g) transporting liquid effluent from a liquid outlet of the clarifier chamber to a decoupling vessel; and (h) transporting liquid effluent from a liquid outlet of the sludge vessel to the decoupling vessel.

22. A method as claimed in claim 21 including transporting the solids and liquid effluent through the settling chamber with an auger with openings in flights thereof, the rate of rotation of the auger being coordinated with the flow rate of effluent through the settling chamber.

23. A method as claimed in claim 22 wherein flow rate through the system is coordinated with pressure of the system.

24. A method as claimed in claim 23 wherein the flocculant and solids containing effluent are fully mixed by the time the outlet of the second mixing chamber is reached and the flow of the mixed effluent through the settling chamber is non-turbulent.

25. A method as claimed in claim 24 wherein retention time of solids containing effluent in the mixing chamber is between about 510 seconds at 15 US gal./min. and 840 seconds at 25 US gal./min.

* * * * *